US012602648B1

(12) United States Patent
Pennetier et al.

(10) Patent No.: US 12,602,648 B1
(45) Date of Patent: Apr. 14, 2026

(54) ADVANCED MULTI-AGENT PATHFINDING AND OPTIMIZATION SYSTEM FOR LOGISTIC NETWORKS

(71) Applicant: QUINCUS PTE. LTD., Singapore (SG)

(72) Inventors: Christophe Pennetier, Oakville (CA); Katrina Hooper, Toronto (CA); Yue Gao, Aurora (CA); Jonathan Erik G L C Savoir, Singapore (SG)

(73) Assignee: Quincus PTE. LTD., Singapore (SG)

( * ) Notice: Subject to any disclaimer, the term of this patent is extended or adjusted under 35 U.S.C. 154(b) by 20 days.

(21) Appl. No.: 18/441,412

(22) Filed: Feb. 14, 2024

(51) Int. Cl.
| | |
|---|---|
| *G06Q 10/08* | (2024.01) |
| *G06Q 10/083* | (2023.01) |
| *G06Q 10/0834* | (2023.01) |

(52) U.S. Cl.
CPC . *G06Q 10/08355* (2013.01); *G06Q 10/08345* (2013.01)

(58) Field of Classification Search
CPC ................... G06Q 10/08355; G06Q 10/08345
USPC ................................. 705/338, 7.25; 709/238
See application file for complete search history.

(56) References Cited

U.S. PATENT DOCUMENTS

| | | | | |
|---|---|---|---|---|
| 10,062,188 | B2 * | 8/2018 | Delling ................. | G06T 11/206 |
| 11,561,107 | B2 * | 1/2023 | Magzimof ........... | H04B 17/373 |
| 11,615,368 | B2 * | 3/2023 | Fu ....................... | G06Q 10/0833 |
| | | | | 705/333 |

(Continued)

FOREIGN PATENT DOCUMENTS

| | | | | |
|---|---|---|---|---|
| WO | WO-2016115629 A1 * | 7/2016 | ............. | G06F 16/29 |

OTHER PUBLICATIONS

Florian Grenouilleau et al. "A Multi-Label A Algorithm for Multi-Agent Pathfinding", 2019, Proceedings of the Twenty-Ninth International Conference on Automated Planning and Scheduling (ICAPS 2019), pp. 181-185 (Year: 2019).*

(Continued)

*Primary Examiner* — Daniel Vetter
*Assistant Examiner* — Freda A Nelson
(74) *Attorney, Agent, or Firm* — Bardmesser Law Group

(57) ABSTRACT

An advanced multi-agent pathfinding and optimization system for logistic networks, revolutionizing fourth-party logistics (4PL) management through Multi-Agent Reinforcement Learning (MARL). It aims to optimize package transportation across multi-hub networks, shifting from a volume-driven approach to a rate-driven model. This system adapts dynamically to business fluctuations, redefining risk dynamics in logistics. It prioritizes shipments based on rate tiers, altering risk distribution and incentivizing efficiency over volume. The system addresses current logistical challenges by integrating multi-modal perspectives and anticipating real-time disruptions, overcoming scalability, adaptability, and dynamic change limitations. Important features include an advanced "GeoEngine" for accurate geocoding, a first/last mile engine with VRP solutions, real-time A* algorithm implementation for hub assignment, and a comprehensive RL model utilizing Q-learning with lightGBM. This system provides a more balanced, market-driven approach to logistics, offering a paradigm shift in efficiency, adaptability, and strategic rate management.

22 Claims, 20 Drawing Sheets

(56) References Cited

U.S. PATENT DOCUMENTS

| | | | | |
|---|---|---|---|---|
| 2011/0046876 A1* | 2/2011 | Pan | ........................ | G06F 16/29 |
| | | | | 345/660 |
| 2020/0401958 A1* | 12/2020 | Furnon | ................... | G06F 16/29 |
| 2021/0295176 A1* | 9/2021 | Jacobs | ..................... | G06N 5/01 |
| 2023/0062293 A1* | 3/2023 | Williams | ............. | B64C 39/024 |
| 2023/0179512 A1* | 6/2023 | Drusinsky | ............... | H04L 45/24 |
| | | | | 709/238 |
| 2023/0230023 A1* | 7/2023 | Khaleghi | .......... | G06Q 10/0833 |
| | | | | 705/7.25 |
| 2025/0053826 A1* | 2/2025 | Meirom | ................ | G06N 3/006 |

OTHER PUBLICATIONS

Ali Cevirici et al., "Solving Logistic Problem with Multi-Agent System" May 11, 2007, Master Thesis in Computer Systems Engineering, 298 pages. (Year: 2007).*

Kaduri, Omri, "From A to MARL (Part 1—MAPF)", Aug. 7, 2021, omrikaduri.github.io; 11 min, 17 pages. (Year: 2021).*

Kaduri, Omri, "From A to MARL (Part—2-AI Planning)", Aug. 7, 2021; omrikaduri.github.io; 12 min, 14 pages. (Year: 2021).*

Kaduri, Omri, "From A to MARL (Part 3—Planning Under Uncertainty)", Aug. 7, 2021; omrikaduri.github.io; 15 min, 16 pages. (Year: 2021).*

Chan et al. "Multi-Agent Pathfinding for Deadlock Avoidance on Rotational Movements", 2022 17th International Conference on Control, Automation, Robotics and Vision (ICARCV) Dec. 11-13, 2022. Singapore, pp. 765-770. (Year: 2022).*

* cited by examiner

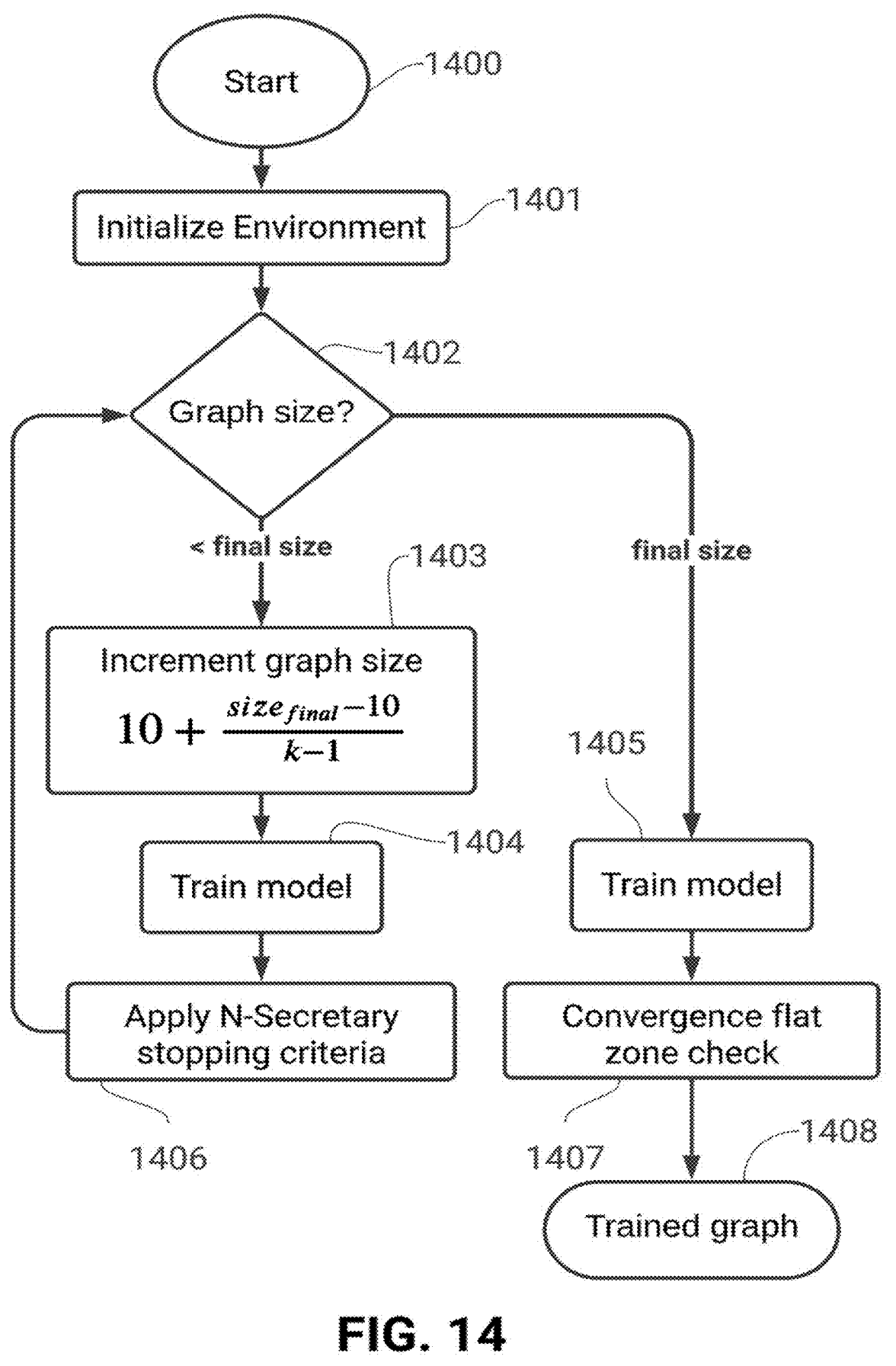

Start ⟋1400

Initialize Environment ⟋1401

Graph size? ⟋1402

< final size final size

1403
Increment graph size
$$10 + \frac{size_{final} - 10}{k - 1}$$

1405

Train model ⟋1404

Train model

Apply N-Secretary stopping criteria

Convergence flat zone check

1406

1407

1408

Trained graph

FIG. 14

ADVANCED MULTI-AGENT PATHFINDING AND OPTIMIZATION SYSTEM FOR LOGISTIC NETWORKS

BACKGROUND OF THE INVENTION

Field of the Invention

The invention relates to artificial intelligence and machine learning in logistics and transportation, particularly enhancing and innovating fourth-party logistics (4PL) management and optimization using Multi-Agent Reinforcement Learning (MARL). The invention also integrates and manages complex logistics systems, particularly optimizing package transportation across multi-hub networks.

The present application describes a groundbreaking shift in the logistics industry's operational paradigm. The traditional model where shipping rates are dictated by volume is challenged, flipping the script to a system where rates drive volume.

Background of the Related Art

The emphasis on efficient supply chain management has been paramount in modern commerce. Industries spanning carriers, e-commerce enterprises, and manufacturing units necessitate an integrated, multi-modal perspective of their logistics chain, striving for optimal and uninterrupted operations.

Efficient supply chain management is especially relevant for companies across diverse domains, such as carriers. e-commerce companies, and manufacturing factories. These entities often require an end-to-end, multi-modal view of their logistical chain to ensure seamless and optimal operations. A key challenge within this scope is the ability to anticipate potential issues or interruptions in real time, respond to them, and navigate through the multitude of constraints in the logistics space, such as time, distance, costs, and carbon emissions. Current methodologies have limitations regarding scalability, adaptability, and the ability to handle dynamic changes.

A salient technical problem these entities grapple with is the need to predict potential disruptions in real-time and promptly devise responses, all while juggling many logistics constraints, such as time, distance, cost, and environmental impact. The conventional modus operandi, predominantly based on deterministic plans, exhibits deficiencies in scalability, dynamic adaptability, and handling of unforeseen changes. Most industry practitioners rely on predetermined plans, like Plan A, B, or C, typically structured in a semi-manual format reminiscent of Excel sheets. These plans, though structured, require human expertise for contingencies when the regular plan falters.

In the existing landscape of logistical optimization, a conspicuous shortfall is the fragmented nature of systems, which are seldom unified across diverse modes of transportation—be it air, sea, road, or rail. Each mode operates in its own siloed domain, leading to compartmentalized solutions that lack an integrated view of the entire logistical chain.

At the same time, the problem can be mathematically posed as a Multi-Agent Path Finding (MAPF) problem, akin to the Vehicle Routing Problem (VRP), which is acknowledged as an NP-hard challenge, indicating complications in finding even approximate optimal solutions, particularly when factors like volume of packages (shipments), number of hubs, connections, and constraints scale up. In other words, a computationally efficient solution (not to mention a realistic one) has not yet been offered for most real-world scenarios.

Consider a fourth-party logistics (4PL) model that adapts dynamically to business fluctuations—be it downturns, growth spurts, or periods of stagnation. In this proposed model, the risk dynamics are entirely redefined. This contrasts with the conventional approach, where the logistics industry operates assuming that higher volumes lead to more favorable rates. This places the onus on the 4PL providers to consistently deliver large volumes to capitalize on rate tiers. While this benefits certain vendors, it ties the success of 4PLs to volume consistency, often at the cost of efficiency and adaptability.

The proposed approach transforms this dynamic. In the proposed model, the 4PL can ensure volume delivery based on the competitiveness of rates. In this system, shipments are allocated according to rate tiers—the lower the rate, the higher the volume they're allocated until their capacity maxes out, after which the next best rate takes precedence.

This methodology doesn't just alter how risk and liability are distributed; it revolutionizes the entire logistics landscape. It challenges existing players to compete not just on volume but on the efficiency and attractiveness of their rates. This shift isn't just a change in operation; it's a strategic move towards a more flexible, responsive, and competitive logistics environment. It incentivizes efficiency and value over sheer volume, promising a more balanced, market-driven approach to logistics management.

Therefore, an approach that seeks to redress this disjointedness is needed by adopting a mathematical framework, transmuting this multifaceted reality into a comprehensive network model.

SUMMARY OF THE INVENTION

The invention is related to an integrated logistics optimization system that employs multi-agent reinforcement learning (MARL), and single agent coupled with heuristics to manage and optimize package routing in multi-hub networks efficiently. A unique approach to orchestrating package flow is proposed, leveraging advanced geocoding and pathfinding algorithms to adapt to various logistical challenges dynamically.

In one aspect, there is provided a method for managing package delivery logistics, the method including inputting a set of package sources and package destinations; converting the package sources and the package destinations into a set of addresses representing geospatial coordinates; identifying vendors who will pick up the packages (shipments) from their sources; inputting a network of hubs and connections and converting the network into a graph where the hubs are represented by vertices and the connections are represented by edges; for each package, identify a first hub to which the vendors will deliver that package; determining an optimal path for each package to transport the package from a first hub to a last hub; identifying vendors who will pick up the packages (shipments) from their last hubs and deliver the packages to the package destinations; wherein the optimal path is determined using a hybrid model that uses a Reinforcement Learning (RL) agent complemented by an A* algorithm, and wherein the RL agent takes into account path distance between the package sources and the package destinations, total time that a package is in a vehicle and time inside a hub, and cost of moving the package from a first depot to a last depot; and dispatching the vehicles of the vendors to pick up and deliver the packages based on the optimal path.

Optionally, to enable training of the RL agent and prediction of the optimal path, (1) the graph is scaled by adjusting all departure and arrival times based on a minimum time of the network, (2) metadata that includes graph metrics, including any of maximum degree, maximum number of neighbors, and nodes ordering, is computed, (3) the network is vectorized into an array form, and (4) each connection has vendor characteristics related to their priority. Optionally, the A* algorithm is used to resolve cases where the agent is blocked from finding a valid path.

This approach revolutionizes traditional logistics models by treating capacity as a dynamic element akin to a currency in a marketplace of rates and volumes. By prioritizing efficiency and adaptability, it enables Fourth Party Logistics (4PL) providers to optimize their operations based on volume consistency, cost-effectiveness, and strategic rate management.

Additional features and advantages of the claimed solution are described in the following disclosure and proved by the actual practice of the invention. These advantages and improvements can be achieved by intelligent agents constructed and trained following the claimed method, precisely following the disclosure, along with the accompanying claims and drawings.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 14 illustrates dynamic training.

DETAILED DESCRIPTION OF EMBODIMENTS OF THE INVENTION

Reference will now be made in detail to the preferred embodiments of the present invention, examples of which are illustrated in the accompanying drawings.

Figure 1:
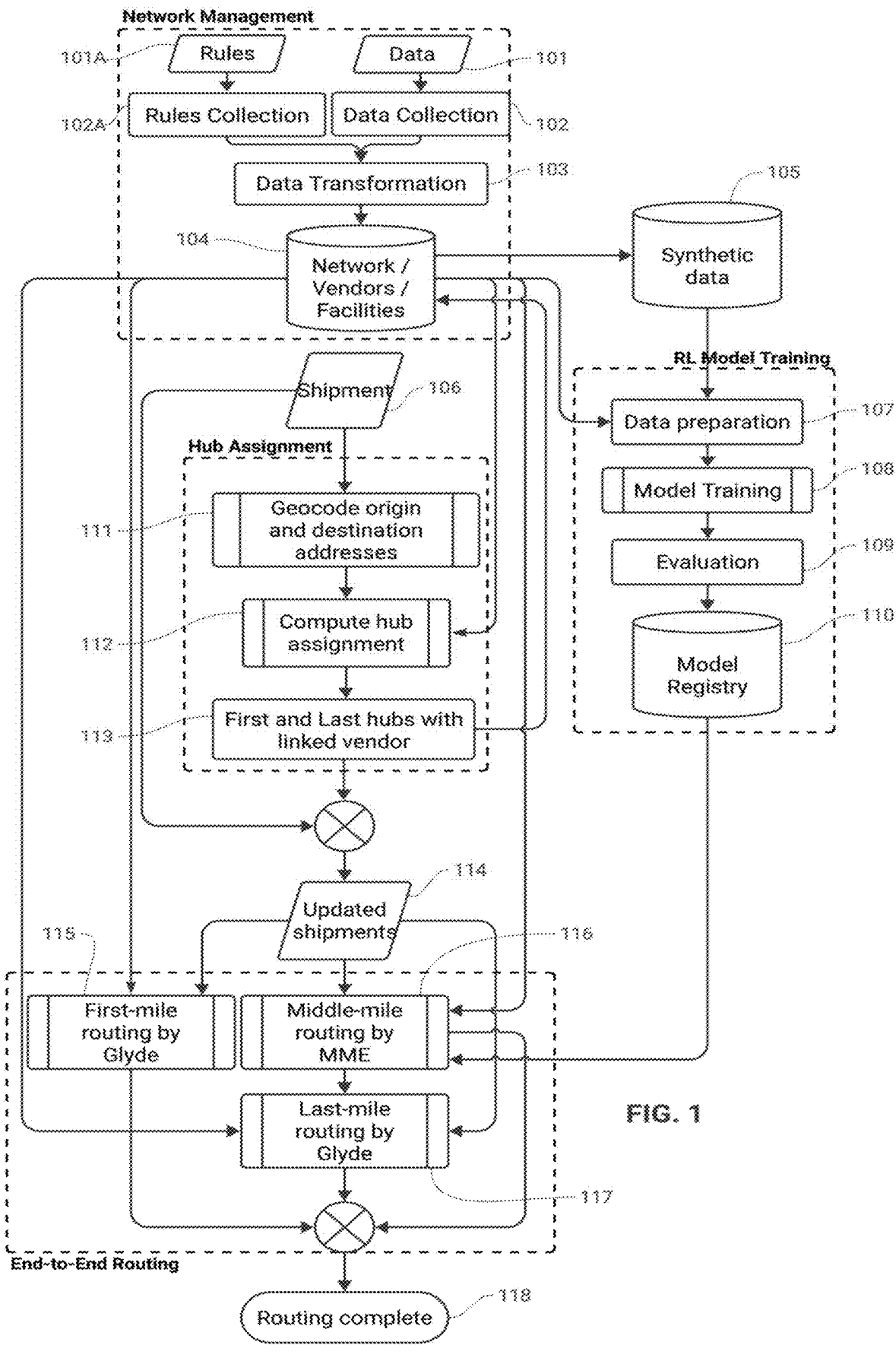
FIG. 1 shows the end-to-end routing process.

As illustrated by FIG. 1, see also discussion below, the comprehensive end-to-end routing process commences with the configuration of the network, comprising an array of hubs, facilities, various connections with specific characteristics, and detailed vendor rules and information. This crucial data undergoes a rigorous process of ingestion and transformation before its storage, ensuring accuracy and accessibility.

Central to the process is utilizing the network information to generate synthetic data. This synthetic data is pivotal in training the Reinforcement Learning (RL) agent. The training regimen for the RL model is initiated with an in-depth data preparation phase. After this, a series of epochs are conducted. These epochs are designed to expose the agent to a diverse array of scenarios, thereby enhancing its accuracy and relevance in decision-making. Post-training, the model undergoes a thorough evaluation phase and then is methodically cataloged in a model registry for future reference and deployment.

Activation of the end-to-end process is triggered upon the arrival of new packages (shipments). An essential step in routing these packages (shipments) involves assigning an initial and a final depot with the corresponding vendors serving them. These depots demarcate the commencement and conclusion of the middle mile phase of transportation. All package addresses are geocoded to facilitate this, and a hub assignment model is deployed. This step ensures that package information is updated based on the model's output.

The routing process then progresses to the first mile, utilizing the "Glyde" Vehicle Routing Problem (VRP) engine. This is followed by the computation of the middle mile, handled by the multi-modal engine (MME). Upon reaching the final depot, the package data is primed for initiating the last mile phase, once again employing the "Glyde" system.

Upon the completion of these stages, the routing process is deemed complete. A detailed exposition of all the models employed in this process is provided in subsequent sections, offering an in-depth understanding of the methodologies and technologies at play.

The proposed concept includes many enhancements to the conventional scheme, such as:

A geocoding engine called "GeoEngine" (FIG. 2, see also discussion below) that surpasses traditional geocoding methods by offering enhanced accuracy and integration with logistics planning.

A first/last mile engine called "Glyde" (FIGS. 3, 4, 5, 6) that applies a combination of deterministic algorithms and metaheuristics for advanced Vehicle Routing Problem (VRP) solutions.

A hub assignment algorithm using time-skewed A* algorithm (FIGS. 7, 8, see also discussion below) to determine each package's first and last depots.

A novel application of the A* algorithm (FIGS. 9, 10), optimized for real-time logistical pathfinding.

A comprehensive and adaptable reinforcement learning model (FIGS. 11, 12, 13, 14, 15, 16, 17, 19, see also discussion below), utilizing Q-learning with lightGBM, dynamic training, a multi-model approach, temperature biasing, and two treatments for multiple packages (shipments) to predict the most efficient routing in complex, multi-agent logistics scenarios.

These advancements are achieved through constructed and trained RL agents, adhering to the methodologies outlined in this disclosure. The accompanying claims and drawings further elucidate the proposed approach, illustrating its impact on modern logistics optimization.

Expanding on these ideas, hub-to-hub optimization is fundamentally a shortest-path problem, falling under the Multi-Agent Path Finding (MAPF) umbrella. In such scenarios, a package with a defined origin and destination mandates the identification of the shortest sequence through the hubs. Contrary to the Vehicle Routing Problem (VRP), where every hub needs visiting, the focus is solely on those hubs that constitute the shortest path. A pivotal element underscoring this problem is its time dependence-ensuring packages (shipments) make scheduled connections and meet delivery timelines while minimizing costs.

Historically, the MAPF problem, akin to the VRP, is acknowledged as an NP-hard challenge, indicating complications in finding even approximate optimal solutions, particularly when factors like volume of packages (shipments), number of hubs, connections, and constraints scale up. Present methodologies often lean towards reinforcement learning for planning, with deterministic solutions employed to supplement the primary model as contingencies arise. Due to the pressing needs of real-world clients concerning throughput and latency, these methods are inevitably fused.

While the complexity of handling a multi-agent system as a singular, high-dimensional entity poses significant challenges, the proposed initial approach was anchored in single-agent strategies. This method focused on determining independent paths for each agent. Yet, modifications were essential to cater to interactions between agents and the inherent capacity constraints of connections. One evident shortcoming of such isolated techniques was their limited search realms, covering merely a subset of the combined configuration potential. Pivoting from this realization, the current research direction leans heavily towards multi-agent reinforcement learning. Two treatments are used to handle multiple agents: (1) sequential and (2) matching. The former works in all cases (online and offline). The latter is dedicated to real-time situations only. A real-time situation occurs in a live system that is optimized or during simulations. The common point is the time element. The sequential approach can be used independently of following a clock. The matching approach must be used with a counter of periods of chosen length (every second, minute, or hour). Building upon the foundation of single-agent models, it becomes possible to integrate heuristics and imitation learning (where agents follow a central policy) to cultivate a synergistic multi-agent ecosystem.

Within the proposed comprehensive network model, hubs, irrespective of their nature or mode, are abstracted as vertices, while the connections, embodying the multitude of transportation links, are depicted as edges. These edges own multiple characteristics that help influence the behavior of the intelligent agents. This is how the notion of temperature that can modify results in a way adapted to users' rules and needs is introduced. This abstraction renders the proposed system "transportation agnostic," enabling seamless interplay between various modes without inherent unwanted biases. To further refine and train the model in a real-world context, synthetic data is designed to emulate authentic logistical patterns and intricacies, ensuring the system's efficacy in theory and practical, on-ground scenarios.

Package Routing Optimization System

I. Overview of the Prediction Process:

A system for predicting the optimal route for a package from its origin to its destination is needed. The underlying network, comprising hubs and connections, is pre-defined and stored in a database. This network contains detailed information for each hub and connection (each connection is linked to a specific vendor, hence having specific information also on vendors). A Reinforcement Learning (RL) model, trained on this network, guides the package's journey. The entire prediction process includes the following sub-processes:

1. Retrieval of package-specific information.

2. Geocoding of the origin and destination addresses using an internal geocoding engine named "GeoEngine." In geospatial computation, a challenge lies in accurately converting textual address data into precise geographical coordinates, a process known as geocoding. The proposed approach delineates an advanced geocoding subsystem that significantly enhances the accuracy and reliability of this transformation, particularly in addressing the limitations of conventional methods.

Traditional geocoding practices primarily employ a memory-intensive approach involving a comprehensive database of pre-mapped addresses and coordinates and an API-dependent method utilizing services such as OSRM, Google Maps, and Here.com. While the former grapples with extensive cold start issues and complex string-matching challenges, the latter is often plagued by a high incidence of false positives, rendering them inadequate for applications demanding high precision.

The proposed approach transcends these limitations by incorporating a multi-stage process designed to clean, parse, and translate addresses, thereby preparing them for enhanced geocoding. This initial stage involves the deployment of multiple translation APIs, supplemented by reverse geocoding techniques to refine and verify the address data. Subsequently, the system generates multiple permutations $(N \geq 5)$ of each address, exploiting the nuances in string variations to reduce the likelihood of erroneous geocoding by conventional APIs significantly.

The core of the subsystem lies in its modular architecture, allowing seamless integration of various geocoding APIs $(M \geq 2)$, thereby leveraging their collective strengths while mitigating their individual weaknesses. This integration facilitates the generation of M×N coordinate sets per address, which are then subjected to a stochastic ranking algorithm. This algorithm computes a weighted average of rankings for each coordinate set, identifying the most probable and accurate geographical representation of the original address.

The system's robustness is further enhanced by implementing a series of analytical techniques to evaluate and rank the precision of these coordinates. This includes a cosine similarity assessment to detect and eliminate false positives through reverse geocoding comparisons, clustering analysis to gauge the density and distribution of the generated coordinates, and leveraging the intrinsic confidence rankings provided by the APIs. Additionally, an Intersection over Union metric is employed to evaluate the quality of API-supplied bounding boxes, further refining the accuracy of the geocoding results.

The proposed system has adaptability and customization capability. The system's modular design allows for integrating location-specific geocoding APIs, addressing the gaps in standard API coverage, especially in regions with less developed geospatial databases. Furthermore, the flexibility in selecting and combining various metrics and APIs tailors the system to meet diverse geocoding needs, making it an invaluable tool in geospatial data processing."

Figure 2:
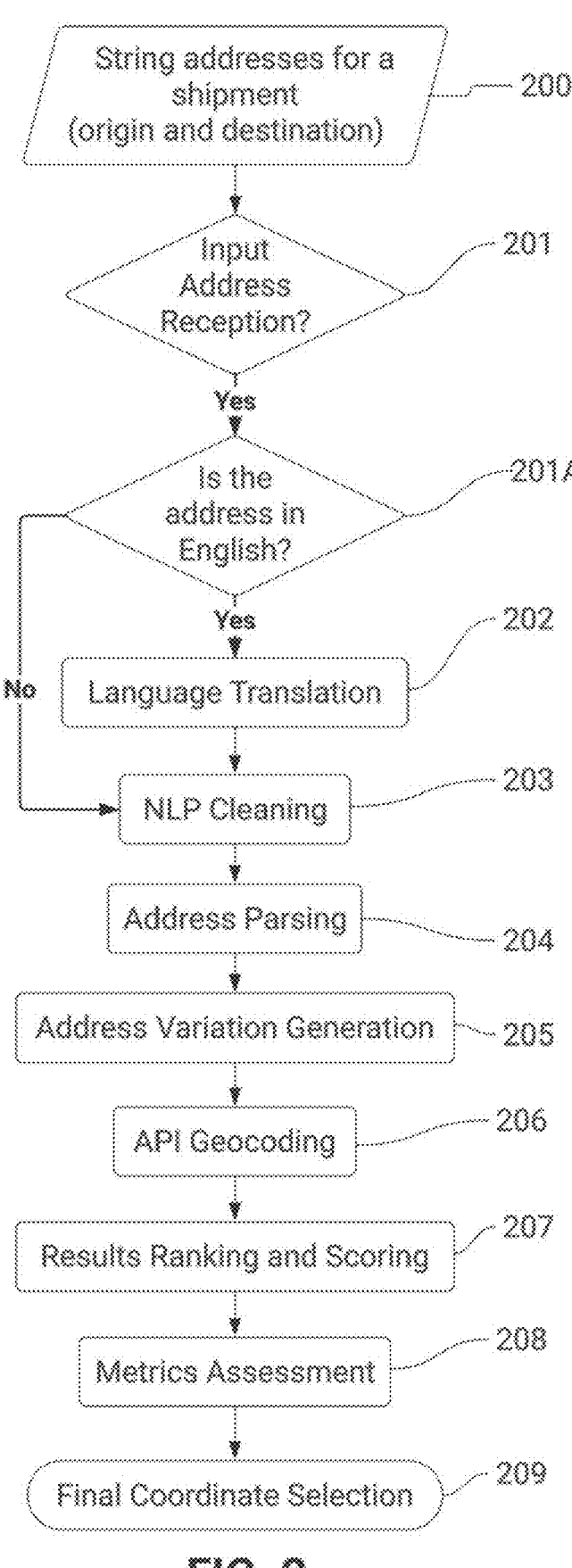
FIG. 2 shows the Geocoding System (GeoEngine).

FIG. 2 shows the geocoding system (GeoEngine, aka GE). This diagram illustrates the advanced GE, showcasing how it converts addresses into geocoded data and integrates with the logistics network to enhance route accuracy and efficiency.

The process starts with string addresses for the package (origin and destination, step 200).

Step 201. The algorithm starts with the reception of the input string address for both the origin and destination.

Step 202. Language Translation: If necessary, the address is translated into a standard language using Google Translate.

Step 203. Natural Language Processing (NLP) Cleaning: The translated address undergoes NLP cleaning, where Libpostal is utilized for preliminary standardization, followed by manual adjustments for country-specific nuances.

Step 204. Address Parsing: The cleaned address is parsed into discrete components (e.g., apartment name, street number, etc.) to identify the hierarchical structure of the postal address.

Step 205. Address Variation Generation: From the parsed address, five variants are constructed, ranging from the full address to the zip code alone. This step accounts for different responses from map APIs based on input granularity.

Step 206. API Geocoding: The address variants are sent to multiple map APIs, including Google and Here.com, for geocoding, with the system designed to integrate additional APIs as needed.

Step 207. Results Ranking and Scoring: The algorithm receives multiple coordinates for each address variant from each API. These are then ranked and scored using a set of metrics.

Step 208. Metrics Assessment, which includes:

Cosine Similarity: To eliminate false positives by comparing the reverse geocoded address against the original.

Clustering Analysis: To assess the concentration and distribution of coordinates, focusing on waypoint density within clusters.

API Confidence Scores: To leverage the intrinsic confidence scores the APIs provide.

Intersection over Union (IOU): To evaluate the relevance of the API-supplied bounding boxes against a reference bounding box.

Step 209. Final Coordinate Selection: Based on the weighted average of the ranks, the version with the best score is selected to represent the geocoded latitude and longitude coordinates.

3. Interaction with a hub assignment API to determine the initial and final depots for the package and the corresponding vendor picking up (first mile) and delivering (last mile) the package.

4. Utilization of the RL model to predict the optimal route for the middle mile phase of the package's journey.

5. Computation of the first mile and last mile segments using a computational engine named Glyde. This engine employs a deterministic core methodology, metaheuristics, and various unsupervised learning techniques. It can address multiple Vehicle Routing Problems (VRP), ranging from simple time-dependent capacitated VRPs to highly complex scenarios with multiple constraints. A groundbreaking logistic engine centered around a proprietary core solver is used, coded in the mathematical language LSP. This core solver interfaces seamlessly with the advanced solving API provided by Hexaly. Hexaly's API employs diverse techniques to ascertain solutions and bounds for optimization problems, adapting fluidly to the constructed model and ensuring optimal method selection for each scenario.

The Hexaly system utilizes a comprehensive suite of methods, including local search algorithms, mixed-integer linear and non-linear programming, column generation, constraint programming, and other specialized techniques.

Figure 3:
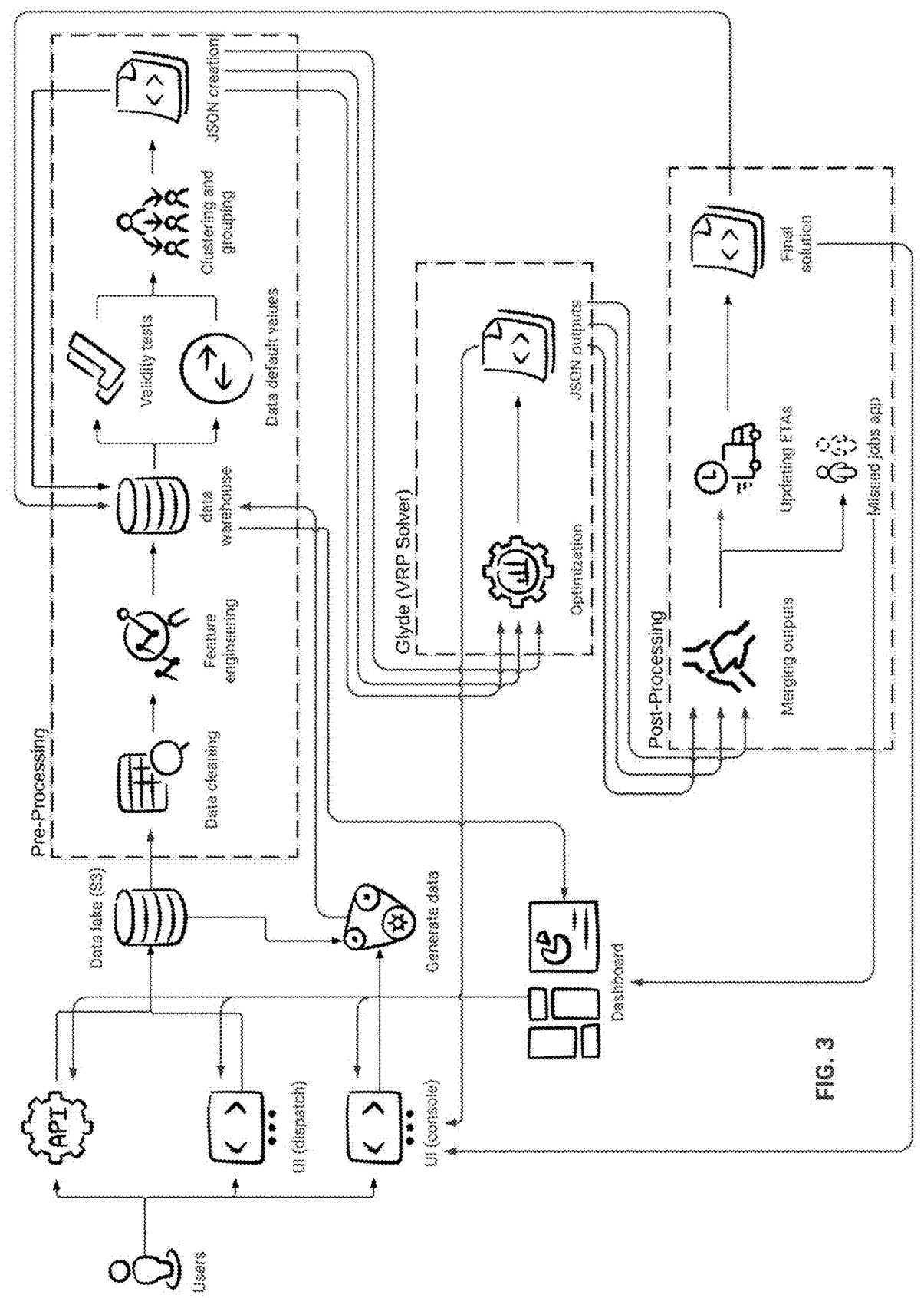
FIG. 3 shows the Glyde Workflow.

FIG. 3 shows the Glyde Workflow, highlighting its use of deterministic algorithms, metaheuristics, and unsupervised learning techniques for solving complex VRP solutions.

As discussed above, a novel system for optimizing vehicle routing problems (VRPs), particularly for first and last-mile delivery scenarios, hereby designated as "Glyde," is disclosed. This system is architected to provide an efficient, scalable, and intelligent solution for dynamic routing challenges.

Access Mechanism and User Interface:

Glyde is engineered for accessibility via an Application Programming Interface (API) or a user interface (UI). The UI is tailored for diverse operational needs, including a "Dispatch" module specifically for dispatchers." Additionally, Glyde features a "Console" interface designed for simulation purposes, wherein users can input synthetic data to establish the parameters of the VRP.

Data Management and Pre-Processing:

The foundational data for initiating the VRP is stored in a robust data lake architecture. A pre-processing stage is implemented, wherein this data undergoes cleansing and transformation. During this phase, problem parameters and variables are constructed and subsequently stored in a data warehouse. Before formulating the Glyde input, a series of validity tests and assigning default data values are conducted. Furthermore, a clustering process is initiated automatically when the number of customer waypoints exceeds a predetermined threshold. Alternatively, this may be done manually at the user's discretion.

Synthetic Data Generation:

Another unique feature of the Console UI is its capacity to generate synthetic data via an in-house algorithm. This functionality helps in simulation scenarios, providing data that closely mimics the format and distributions of authentic data within the data warehouse.

Problem Solving and Output:

Glyde is designed to accept input in JSON format and employs advanced algorithms to solve the VRP, providing solutions in JSON format. In instances where input data is clustered, Glyde processes multiple files concurrently across different server instances.

Post-Processing and Solution Enhancement:

After the problem-solving phase, a post-processing stage commences. Here, solutions derived from clustered and parallel processing are amalgamated. This phase is characterized by its flexibility and modularity, allowing for the integration of various models based on specific requirements. The standard implementation of Glyde includes two primary functions:

1. Real-time Traffic Update: Solutions are dynamically adjusted in response to real-time and historical traffic data sourced from Map APIs like Google Maps. This adjustment maintains the original distribution sequence but updates the estimated arrival times (ETAs).

2. Analytical Functionality: Glyde is equipped with an analytical tool to assess solutions, particularly in scenarios where not all customers can be served (i.e. when an optimal solution satisfying all constraints is unfeasible). This tool generates a comprehensive analysis, considering multiple metrics such as customer density, distance and time metrics, time window constraints, and fleet characteristics. The outcomes of this analysis are briefly presented in a dashboard format.

Glyde represents a significant advancement in VRP solutions, particularly for first and last-mile delivery challenges, offering a versatile, intelligent, and user-friendly system.

Figure 6:
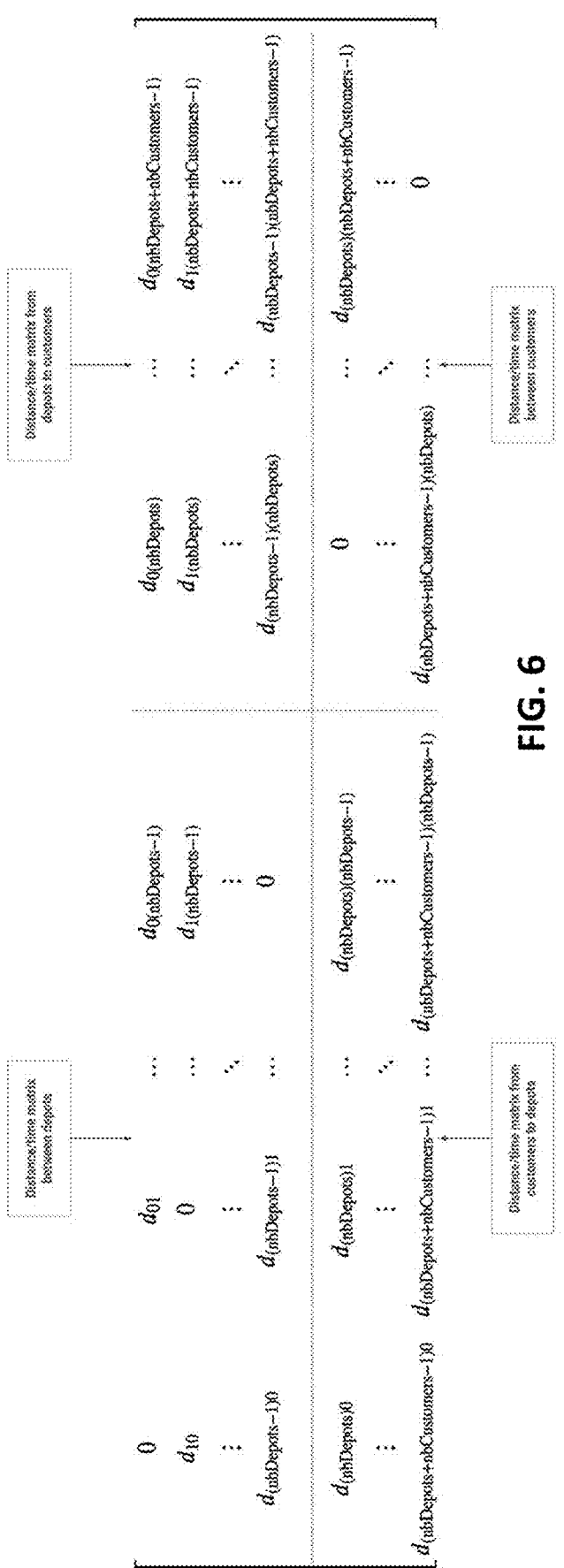
FIG. 6 illustrates the way time and distance matrices are built in Glyde.

In-house complete code enables the VRP model to efficiently address over 95% of first and last-mile delivery configurations. The VRP model is characterized by a flexible and detailed initial setup (scc FIG. 5), including:

1. An innovative approach to computing matrices (FIG. 6, see also discussion below). Using multiple networks, time and distance matrices can be computed for each type of vehicle from a different configuration. This means that different speeds and traffic conditions can be used, or limitations (such as tolls or highways) for each vehicle in the fleet can be set up. This differs from typical VRP engines, which rely on an approximation that assumes all vehicles use the same time/distance matrix.

2. Time units: One matrix is used for each second of the VRP's time span to measure traffic. This approach allows us to divide the VRP timeline into periods of similar traffic, accounting for traffic per type of vehicle. This is unique because adjust time matrices can be adjusted per type of vehicle and second. The best approach is to have periods that depend on the speed of vehicles on the road. Acceleration is used as a metric to split the timeline into buckets. The higher the acceleration in absolute value, the smaller the time bin.

3. Depots: Supports numerous depot configurations, ranging from a single depot for all drivers to individual depots for each.

4. Drivers: Adaptable for scenarios from a single driver (TSP) to multiple drivers (various VRP configurations).

5. Vehicle Types: Accommodates both homogeneous and heterogeneous fleet compositions.

6. Visits-Customers: Handles a range of customer interactions, including deliveries, pickups, and on-the-go services.

To simulate real-world situations accurately, the model includes various adjustable constraints. All Vehicle Routing Problems (VRP) have a set of constraints to minimize the objective function. The user can customize every aspect of VRP. The constraints mentioned below are the most commonly used in VRP and are frequently requested by dispatchers in various businesses:

Breaks & Working Time: Offers multiple break options (fixed, variable within time windows, and regular) and a maximum working duration.

Loop Rule: Includes options for returning to the depot or ending at the last customer.

Priority Handling: Employs a direct and scalable treatment of customer priorities, with an optional logarithmic scale for enhanced discrimination.

Time Windows: Enables multiple service time windows for customers.

Vehicle Capacity & Costs: Supports multi-dimensional capacity constraints and varied cost calculations across different vehicle types.

Vehicle Speed: Each vehicle type can have a distinct speed setting.

Additionally, the model features pre-assignments (mandatory or forbidden services for specific drivers), sequence constraints (services in the same route, in sequence, or direct sequence), and limitations on tour distance and customer numbers.

The engine optimizes various objectives, such as minimizing the number of tours, distance, travel time, waiting time, span, end time, routing costs, and carbon emissions. Data inputs for the engine include networks, depots, vehicle types, drivers, and customers, each with unique attributes like cost, capacity, speed, carbon emissions, limitations, and demand.

The system utilizes a robust core solver capable of efficiently resolving complex VRP involving up to 10,000 waypoints in under ten minutes. This performance metric significantly surpasses conventional approaches, substantially advancing routing optimization technology.

Figure 4:
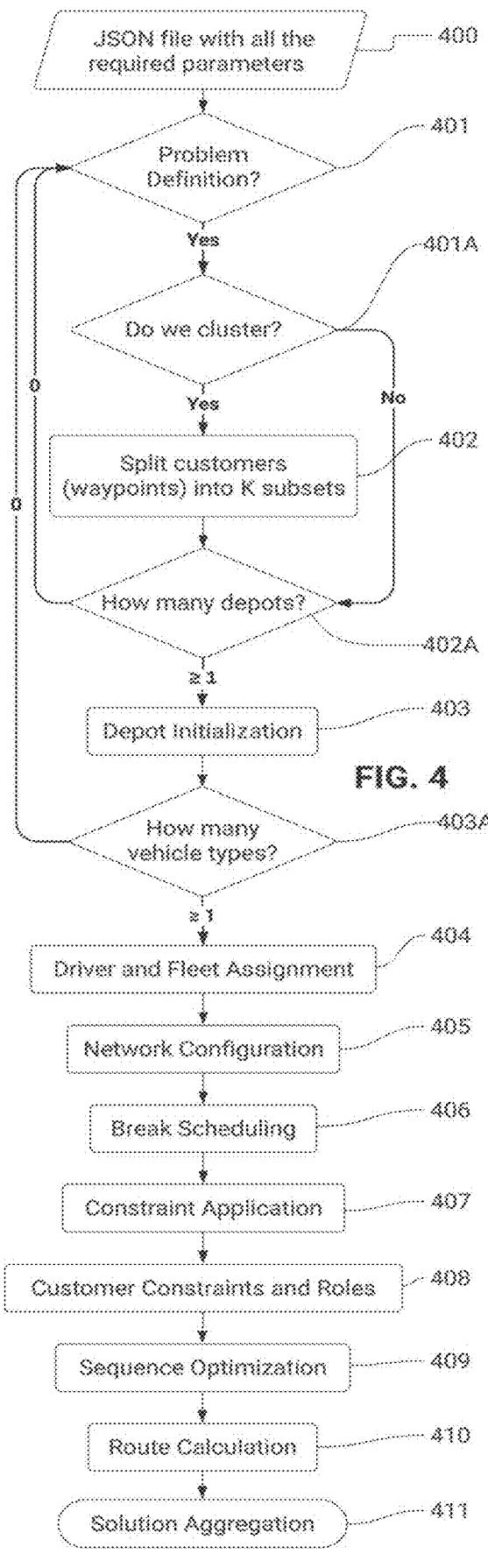
FIG. 4 shows the Glyde detailed flow chart.
Figure 5:
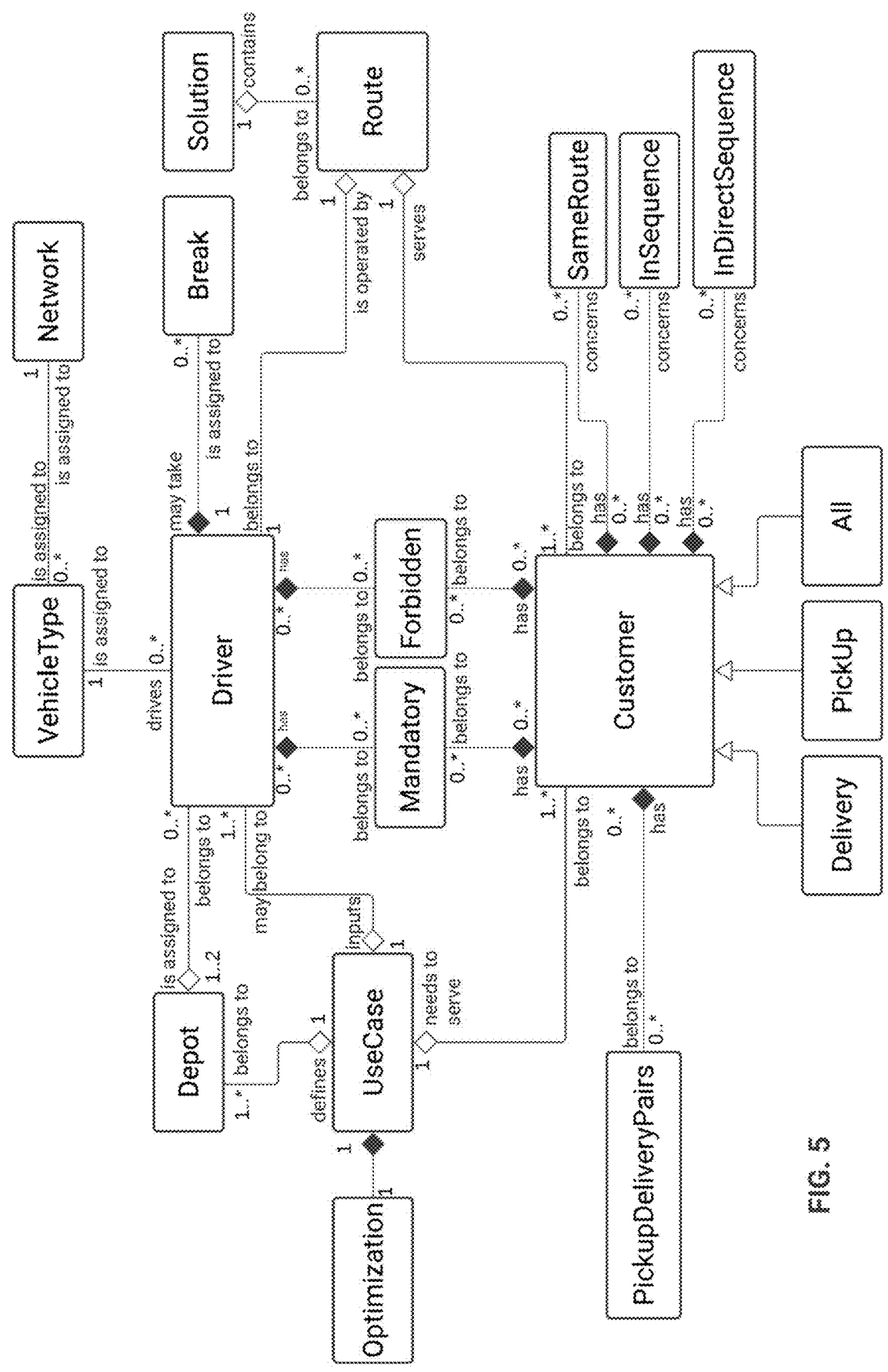
FIG. 5 shows the Glyde UML class diagram.

FIG. 4 shows the Glyde detailed flow chart. The process delineates a multi-step optimization for delivery routing, starting with problem definition and ending with solution aggregation, ensuring efficiency and compliance with constraints. Key steps include depot initialization, driver and fleet assignment, network configuration, and the application of various constraints and roles, culminating in calculating optimal routes for each driver.

The following steps are performed:

Step 400: Starting with the JSON file with the required parameters.

Step 401: The process begins with creating an optimization problem tailored to a specific use case. The use case establishes the parameters and requirements of the routing challenge. Step 401A: A clustering decision is then made.

Step 402 splits customers into waypoints. Depending on how many depots there are (step 402A), Step 403 performs Depot Initialization. The algorithm identifies one or more depots as starting points for the delivery routes.

Step 404: Drivers enter the system, each assigned a vehicle from a heterogeneous fleet. This step ensures that each vehicle's capabilities match the designated routes' requirements. The algorithm proceeds based on the number of vehicle types (step 403A).

Step 405: A corresponding network is established for each vehicle, including a specific time and distance matrix to optimize routing.

Step 406: The system allows scheduling one or more breaks for each driver, adhering to legal and operational constraints.

Step 407: Individual constraints are applied to drivers, including mandatory customer assignments or prohibitions against serving specific customers.

Step 408: Customers are defined with specific constraints and roles, such as delivery, pickup, or on-the-go services. The algorithm accounts for customer-to-customer same-day services.

Step 409: The system optimizes the sequence of stops for customers requiring service by the exact driver. Direct sequences are also managed where no other customers can be inserted in between.

Step 408: The system allows scheduling one or more breaks for each driver, adhering to legal and operational constraints.

Step 409: Finally, the engine generates a comprehensive solution that encompasses the optimal routes for all drivers, ensuring efficiency and adherence to constraints.

Step 410. The solver calculates an optimal route for each driver, considering all variables and constraints.

Step 411. Finally, the engine generates a comprehensive solution that encompasses the optimal routes for all drivers, ensuring efficiency and adherence to constraints.

So far, the system is known as "Glyde." Glyde system includes an advanced core solver, a pivotal component that sets a new industry standard for efficiency and capability in vehicle routing problem (VRP) resolution. This solver, a product of Hexaly's pioneering technology, is distinguished by its unparalleled ability to handle complex VRPs, encompassing up to 10,000 waypoints, and delivering solutions in a remarkable timeframe of under ten minutes. This feat of computational efficiency and speed significantly eclipses the performance metrics of existing solutions in the market, marking an advance in routing optimization technology.

The exemplary performance of the solver is attributed to its coding in the LSP language, a proprietary language of Hexaly's solver. The LSP language, known for its efficiency and optimization-friendly features, serves as a conduit through which the raw power and advanced algorithms of Hexaly's solver are channeled and optimized.

By leveraging the superior technological foundation of Hexaly's solver, Glyde's core solver is fine-tuned to reach peak performance levels. The native LSP language coding ensures that every aspect of the solver's operation is streamlined for maximum efficiency and speed, thus enabling Glyde to deliver swift, accurate, and reliable solutions in even the most complex and demanding VRP scenarios.

In summary, Glyde's core solver, empowered by Hexaly's cutting-edge technology and optimized through in-house expert coding in LSP language, stands as the best-in-class solution in the market, fundamentally transforming the landscape of VRP optimization.

Surrounding this core solver, the system incorporates both pre and post-processing applications. These applications are essential in enhancing the applicability and interpretability of the solver's output, ensuring that the solutions are theoretically sound and practically executable.

One of the critical features of the proposed system is the incorporation of clustering techniques, including geographical, manual, and density-based clustering. These techniques are pivotal in aligning the solutions with realistic execution scenarios, which is crucial for practical field application.

In particular, the system innovatively employs a K-means clustering algorithm. Traditional implementations of K-means use Euclidean distance (in kilometers) to determine cluster centroids. However, the proposed modified approach replaces this with the time required to reach each waypoint, offering a more relevant metric for VRP. This unique adaptation of the K-means algorithm ensures that the clustering is more aligned with real-world conditions, providing dispatchers with tractable and actionable zoning information. The Glyde system incorporates a refined implementation of the K-means clustering algorithm, an integral component that enhances its capability to address complex vehicle routing problems (VRPs). Below, the conventional K-means clustering methodology and the innovative modifications applied in Glyde are explained.

Conventional K-Means Clustering:

At its core, the traditional K-means clustering algorithm is used in data analysis to partition a set of data points into distinct groups, known as clusters. This algorithm typically employs Euclidean distance—a measure of the straight-line distance between two points in space, usually quantified in kilometers—to ascertain the 'centroids' or centers of these clusters. K-means facilitates efficient data organization into manageable clusters by grouping data points (in this context, customer waypoints defined by latitude and longitude coordinates) based on proximity to these centroids.

Proposed Time-Based Approach:

Glyde, however, departs from this conventional distance-based clustering. Recognizing that in VRP, the relevant factor is not merely the physical distance between waypoints but the time required to traverse this distance, the system adopts a time-based clustering approach. This method calculates clusters based on the time it takes to reach each waypoint rather than their spatial distance. This shift in metric from distance to time aligns more closely with the practical realities of routing logistics.

The reason behind this strategic adaptation is grounded in the dynamics of real-world travel conditions. Travel time between waypoints is influenced by factors such as traffic conditions, road types, and speed limits, which are not accurately represented by mere Euclidean distance. By clustering customers (waypoints) based on travel time, Glyde's modified K-means algorithm provides a more realistic and applicable grouping. This approach ensures that the resulting clusters reflect actual on-road travel scenarios, enabling dispatchers to plan more time-efficient and practical routes in real-world conditions.

Benefits of Time-Based Clustering:

The advantage of using time as the clustering metric is many-fold. It allows for more accurate estimations of route durations, better resource allocation, and improved service quality by minimizing delays. This unique adaptation of the K-means algorithm in Glyde results in zoning information that is more aligned with real-world logistics and more actionable and practical for dispatchers handling intricate VRP tasks.

In summary, Glyde's innovative use of a time-based K-means clustering algorithm represents a significant enhancement over traditional distance-based clustering methods. This approach underscores Glyde's commitment to providing solutions that are not only technically advanced but also profoundly attuned to the practical demands of vehicle routing and dispatch management.

Furthermore, the system integrates a Density-Based Spatial Clustering of Applications with Noise (DBSCAN) approach. While DBSCAN is less intuitive for end-users than K-means, it aligns more closely with the intrinsic goals of VRP optimization. DBSCAN clusters waypoints based on the density pattern, which, in turn, facilitates more effective VRP solutions. This is because VRP optimization yields better results when drivers are allocated to zones with a homogeneous density of customers.

Combining these advanced clustering techniques with the high-performance core solver significantly reduces the solution's latency to a mere tens of seconds. This reduction is not just a technical achievement but also a practical one, as it allows dispatchers to organize customer deliveries quickly and efficiently within their respective zones. By launching the engine in each zone in parallel, the system further enhances efficiency and scalability.

A unique, efficient, and practical solution to complex VRP challenges is proposed. It integrates K-means and DBSCAN clustering algorithms with a high-performance core solver, aligning advanced technical capabilities with real-world business needs.

Traffic considerations are incorporated using data from external APIs or other proprietary or third-party datasets, enhancing the accuracy of routing solutions. Post-processing involves a comprehensive analysis of the results, employing SHAPLEY-inspired methods and sensitivity analysis to gauge the impact of each constraint. This analysis is conveyed through maps, dashboards, and charts.

The proposed logistic engine represents a paradigm shift in VRP solutions, combining unparalleled computational efficiency, adaptability, and a profound understanding of real-world logistics challenges.

II. Hub Assignment Process:

The hub assignment process includes three main steps:

1. An isochrone method is an approach to hub selection for logistical operations. The core of this subsystem is the innovative use of an isochrone method for determining the N nearest hubs to a given package. This method is distinct in its ability to consider not just direct spatial distance or cost but also the time-constrained distance, which factors the time to reach these hubs under various conditions. This dual consideration of distance and time ensures a more efficient and realistic approach to hub selection than traditional distance-only methods.

Hub selection is confined to a predefined serviceable area. Each route is linked to a specific vendor with characteristics like serviceable zones, costs, and volume constraints. This area can be delineated in two primary ways: either manually, through the specification of zip codes, or automatically, by calculating Euclidean distances. The manual method allows for targeted selection based on specific geographic boundaries, while the Euclidean distance method offers a more mathematical and objective approach.

A key feature of this subsystem is its parametrizability. When the isochrone method is activated ('on'), the system transitions from a simple distance-based hub selection to a more complex time/distance consideration. In this mode, hubs are evaluated on their spatial proximity to the package and the time required to reach them. This time factor can be refined to include real-world conditions such as traffic, making the hub selection process highly responsive to actual on-ground scenarios.

When the isochrone feature is deactivated ('off'), the system reverts to the conventional method of selecting hubs based solely on their distance from the package. This mode aligns with the approaches used by most competitors and standard systems in the industry, providing a familiar but less nuanced hub selection process.

Essentially, the isochrone method adds a significant layer of sophistication and adaptability to the hub selection process. By allowing the option to switch between simple distance-based selection and a more intricate time/distance calculation, this subsystem provides a versatile tool for optimizing logistical operations. Its ability to account for real-world factors like traffic in the time-based calculation further enhances its practical applicability and effectiveness in ensuring efficient and timely package distribution.

2. Update of the in-memory network. Two new vertices (the origin and destination of the package) and new connections are added from the package address to the chosen hub. This step also involves modifying the graph's metadata, such as updating hubs' in/out degrees. The middle mile process uses such metadata in its model, which is why the network is updated this way. As is the case for the middle mile network, the new connections have temperature factors that reflect the rules dispatchers can configure regarding vendors.

3. Another system component is the advanced hub assignment process, which helps determine the most efficient first and last depots for each package. A novel adaptation of the A* algorithm, renowned for its effectiveness in pathfinding and graph traversal, is employed to achieve this. The traditional A* algorithm, which is a best-first search algorithm that relies on an open list and a closed list to find a path that is both optimal and complete toward the goal, is modified to be time-dependent, a feature specifically tailored to address the dynamic nature of logistics and transportation.

In this time-dependent A* algorithm, each edge in the graph represents a scheduled vehicle departure with a fixed and predetermined time. This modification allows the algorithm to consider the distance between nodes and the time-specific constraints associated with each route. Such an approach is particularly crucial in logistics, where timing is as important as distance, if not more.

This algorithm calculates the shortest path from the package's origin to its destination, considering both the spatial and temporal dimensions. Unlike traditional pathfinding algorithms that primarily focus on distance, the proposed time-dependent A* algorithm integrates vehicles' departure and arrival times into its calculations. This integration enables the algorithm to identify the most time-efficient routes, considering traffic patterns, scheduled departures, and transit times. In the context of a system designed for routing optimization within a network, each connection within the network is assigned a distinct temperature factor. This temperature factor is engineered to adjust the values of the objective function at each decision point within the routing process. As a result, the selection of the most advantageous hub and vendor combination, represented as a (hub, vendor) tuple, is systematically influenced. This influence is directed to align with predefined criteria based on user-specified rules about vendors, thereby ensuring that the routing decisions adhere to the strategic preferences or requirements set by the users.

An auxiliary benefit of this method is its potential to identify a feasible route for the package that meets all logistical constraints. If such a route is found and all constraints are satisfied, this route can be directly adopted, eliminating the need for further complex computations. This aspect is particularly advantageous in high-volume logistics operations, where efficiency and speed arc paramount.

The uniqueness of the modified time-dependent A* algorithm lies in incorporating time-based variables into the pathfinding process. This enhances the accuracy and relevance of the routing decisions and significantly contributes to the overall efficiency of the logistics and transportation system. By optimizing both the spatial and temporal aspects of routing, the system offers a distinct and superior solution in logistics optimization.

This invention (hub assignment) integrates the time-dependent temperature-driven A* algorithm to ascertain the shortest and most viable path for transportation from an initial point (origin) to the final point (destination). This algorithm's application determines the optimal initial and final depots (and the corresponding vendors to serve them) for package transit within a scheduled network, where departures from hubs are time-specific. Depots that will optimize all the routes are chosen and cannot be chosen just based on the isochrone approach. Thus, it is necessary to generate candidates with the isochrone approach (like a filter) and use a simplified shortest path approach (more straightforward than the complete problem with all its constraints) to determine which depots and vendors are the best suited for the problem. In more detail:

The time-dependent A* algorithm, while not a novel concept in its conventional form, is innovatively applied in the context of hub assignment for transportation networks. Its unique contribution lies in its capacity to factor in temporal variables, such as varying traffic conditions and time-specific constraints, which are pivotal in scheduled transportation networks. This consideration of time-dependent factors enables the algorithm to compute routes that are not just spatially efficient but also temporally optimized, aligning with the precise scheduling requirements of the network. The temperature-skewed results are another unique innovation of the method. It adapts to the practical needs of a theoretical algorithm.

In this system, the algorithm evaluates the cost of travel along different routes, considering vendor characteristics, distance, and time factors. The time component is especially significant in scheduled networks, as it accounts for variations in traffic patterns, congestion levels, and other time-sensitive variables that can impact the feasibility and efficiency of a route.

One of the salient advantages of employing the time-dependent A* algorithm in this context is its potential to identify a feasible route for package transit that meets all network constraints, even if the A* algorithm simplifies the RL algorithm used for the middle-mile optimization. If such a route is determined, it can be directly adopted for transportation purposes, thereby circumventing the need for additional computational efforts to identify better alternative routes.

This application of the time-dependent A* algorithm represents a strategic adaptation of existing technology to address the specific challenges of hub assignment in a transportation network. By simplifying part of the transportation process and focusing on the most critical constraints, the algorithm provides a streamlined and effective solution for route optimization. Its integration into the system is particularly advantageous in scenarios where complete adherence to all transportation constraints is not mandatory, allowing for a more flexible and efficient approach to route planning and depot selection.

In summary, using the time-dependent temperature-skewed A* algorithm in this subsystem exemplifies a novel application of such computational techniques to enhance the efficiency and effectiveness of hub/vendor assignment and route planning in scheduled transportation networks. This innovative application underscores the system's ability to adapt and optimize logistical operations under specific temporal and spatial constraints.

Figure 7:
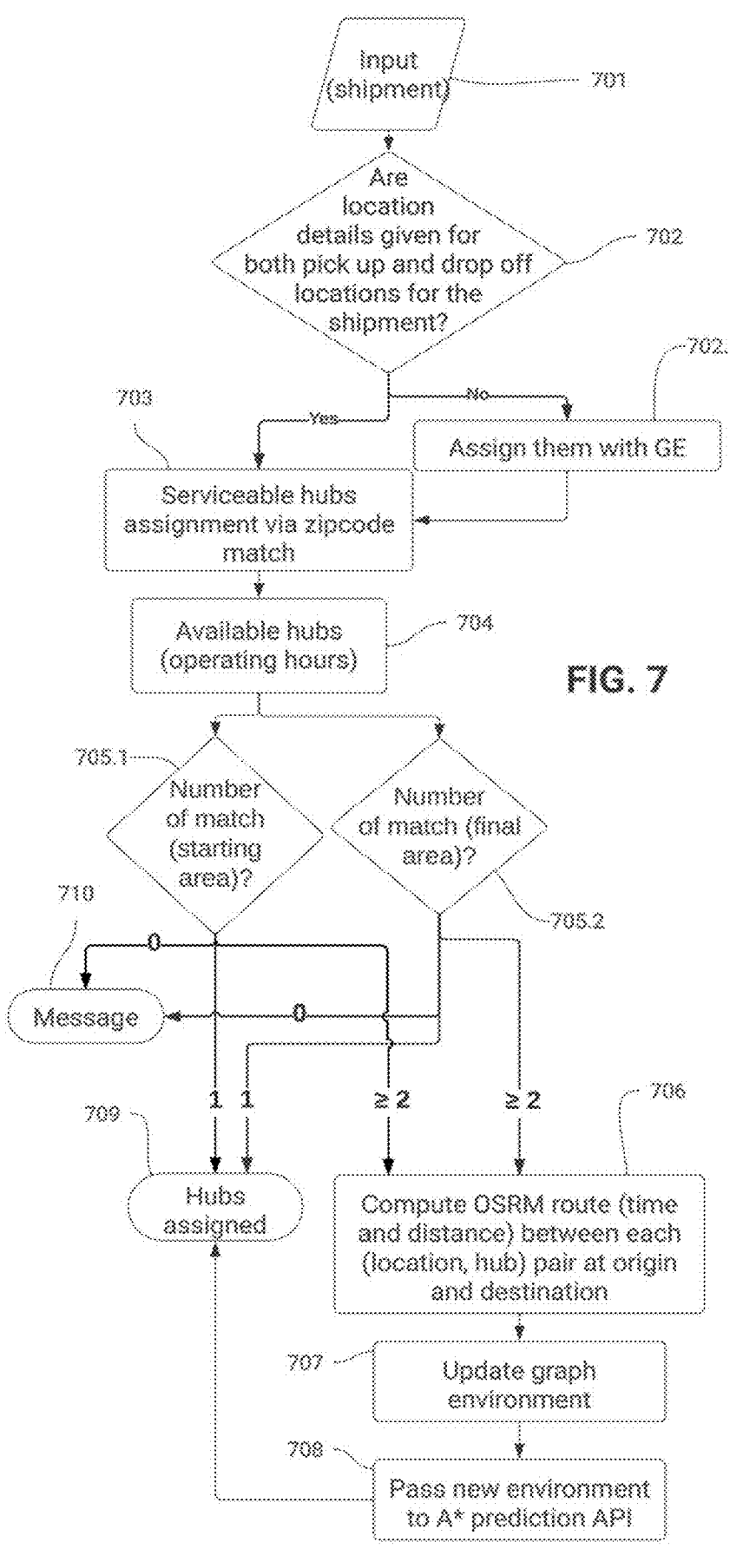
FIG. 7 shows the A*-driven hub assignment.

FIG. 7 shows the time-skewed A*-algorithm-driven hub assignment. The algorithm initiates package data input, ensures data quality by verifying zip codes, and uses Geo-Engine for any missing zip codes to proceed with hub assignment. It filters hubs by availability and conducts parallel processes to match packages (shipments) to the origin and destination hubs. It utilizes the OSRM for computing matrices and the time-skewed A* algorithm for optimal route calculation (with vendor temperature factors), concluding with the output of hub assignments for each package. In the figure:

Step 701. The algorithm begins with the input of packages (shipments), each package containing comprehensive data, including origin and destination addresses.

Step 702. The algorithm performs an initial data quality check to verify the presence of location information (country, state, city, and zip codes) in the package addresses.

Step 702.1 If any location details are missing, the Geo-Engine (GE) is invoked to assign the missing geographical elements based on the available address information.

Step 702.2 If location/geographical details are present, the process proceeds directly to the next step.

Step 703. The algorithm matches packages (shipments) to serviceable hubs based on geographical location using the location details, either derived or initially present.

Step 704. The algorithm filters the potential hubs based on their activity status and operating hours to ensure they can handle the packages (shipments).

Step 705. Two separate decision-making processes occur in parallel to determine the number of available hubs for the origin and the destination.

Step 705.1 Origin Hub Match:

No Match (0 hubs): An error message is generated.

Single Match (1 hub): The matching origin hub is selected for the package.

Multiple Matches (2 or more hubs): The algorithm proceeds to the computing step.

Step 705.2 Destination Hub Match:

No Match (0 hubs): An error message is generated.

Single Match (1 hub): The matching destination hub is selected for the package.

Multiple Matches (2 or more hubs): The algorithm proceeds to the computing step.

Step 706. Computing Step: The Open Source Routing Machine (OSRM) is employed to compute time and distance matrices for each potential hub in the origin and destination areas.

Step 707. Graph Update: The calculated time and distance matrices update the graph that models the use cases, incorporating the new data for improved decision-making.

Step 708. Optimal Route Calculation: The time-skewed A* algorithm determines the best route for each package, considering the updated graph and the computed matrices. If the algorithm does not find the solution, the time constraint is relaxed and a first an arrival-time A* algorithm (the constraint is to arrive on time) is used, and second, in case of this algorithm does not find a solution either, a standard A* algorithm (the constraint is just to arrive at destination).

Step 709. Output Generation: Upon determining the best routes, the algorithm outputs the first and last hubs for each package, completing the hub assignment process.

Figure 8:
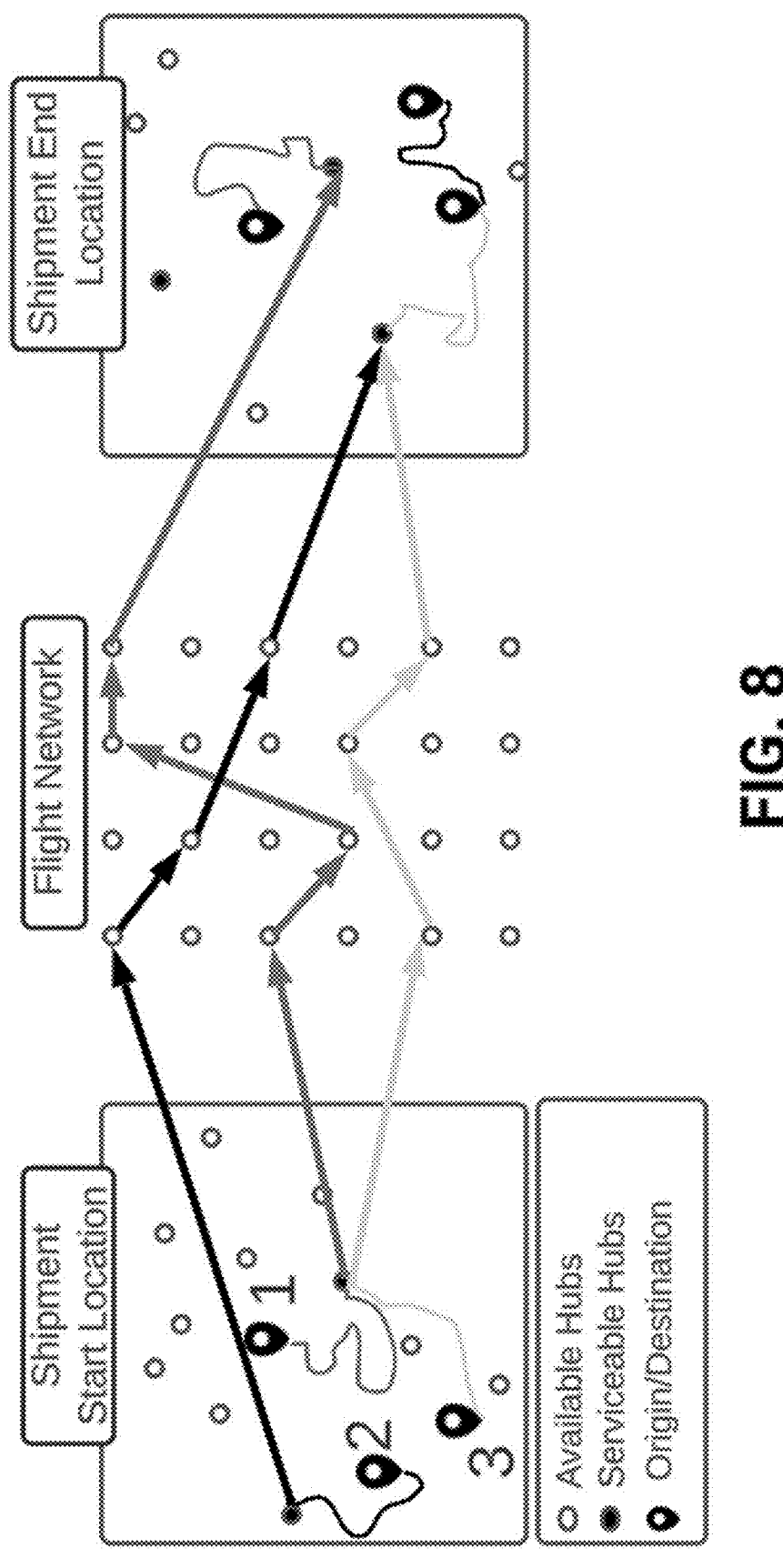
FIG. 8 illustrates the hub assignment in a drawing with three packages.

FIG. 8 graphically illustrates the hub assignment in a drawing with three packages (shipments).

Figure 10:
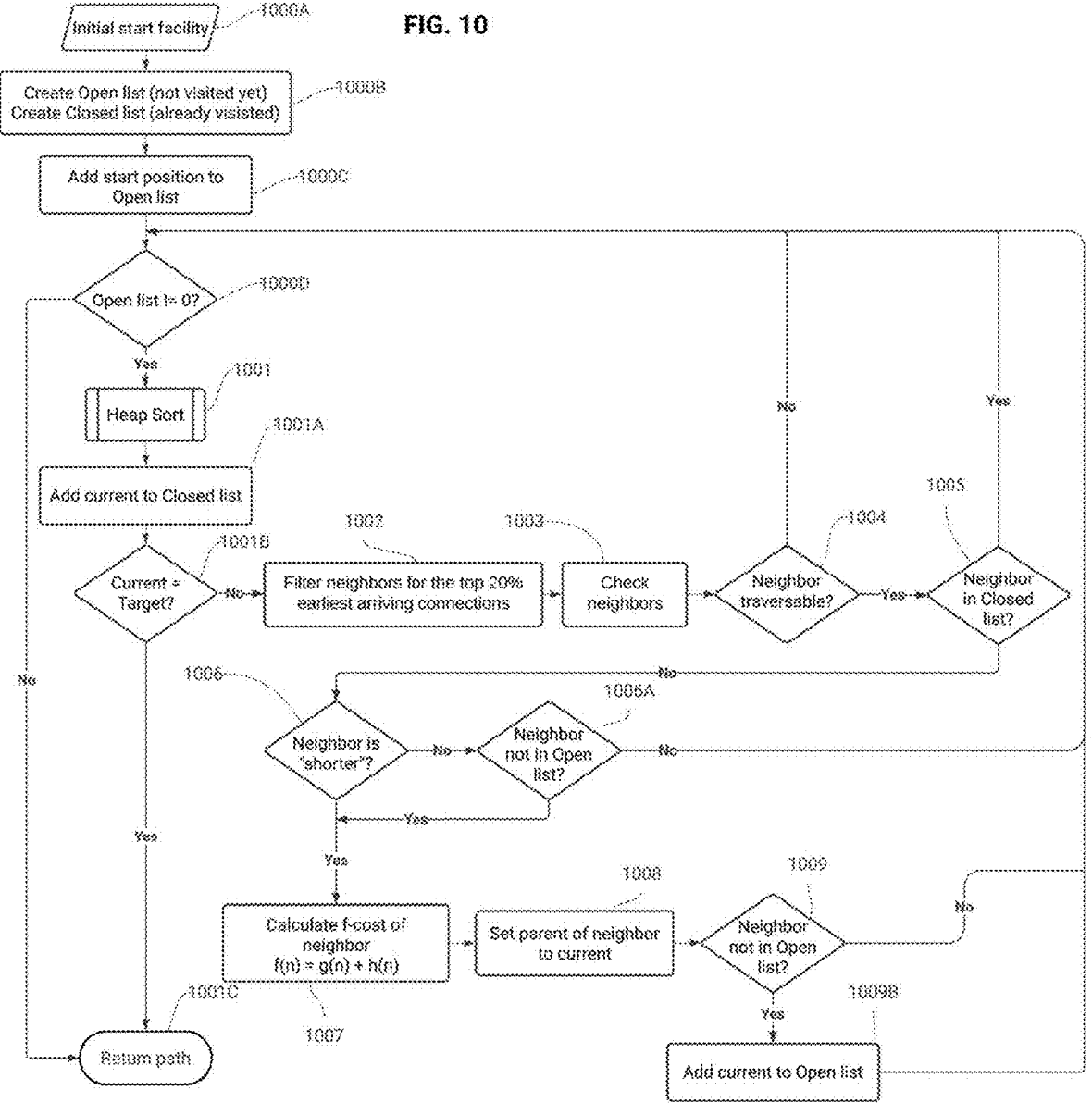
FIG. 10 illustrates how the A* algorithm is modified for logistics.

FIG. 10 illustrates how A* is modified for logistics. An explanation of the A* algorithm and the role of the heap data structure in it is as follows:

1. A* Algorithm Overview:

A* stands for "A star," and it is a best-first search algorithm.

It maintains two sets of nodes: open set and closed set.

The open set contains the nodes that are candidates for exploration.

The closed set contains the nodes that have already been evaluated.

The algorithm assigns a cost to each node based on the path cost from the start node and a heuristic estimate of the remaining cost to the goal.

The sum of the path and heuristic costs is called the "f-score." In this case, an f-cost.

A* selects nodes to explore based on their f-scores, prioritizing nodes with lower f-scores.

All the f-scores consider temperature factors.

2. Role of the Heap Data Structure:

A* relies on a priority queue to efficiently select nodes with the lowest f-scores for exploration. This is where the heap data structure comes into play.

A heap is a specialized binary tree-based data structure where the parent node always has a smaller value than its children, making it efficient for quickly finding and removing the minimum element.

In A*, the heap is typically implemented as a min-heap, where the node with the smallest f-score is always at the root.

A* maintains the open set as a heap, with each node representing a candidate for exploration.

When wanting to explore the next node, the node with the lowest f-score from the heap is extracted, ensuring the most promising node is prioritized.

The flowchart in FIG. 10 outlines the A\* search algorithm that was skewed to consider time, commonly used in path-finding and graph traversal. In logistics, packages (shipments) must find the path with the smallest cost or distance, considering the package arrives on time.

With further reference to FIG. 10, a step-by-step explanation after the heap sort described above is as follows:

After initialization (step 1000A), the algorithm creates lists of visited (i.e., closed) sites and not yet visited (i.e., open) sites (step 1000B).

The start position is added to the open list (step 1000C). The heap sort occurs (step 1001) if the open list is zero (step 1000D). Otherwise, the algorithm proceeds to the return path (1000C).

Step 1002: To increase chances that the chosen path is not only the one with a minimum cost but also feasible in terms of arrival time before expectations, at each node, only the top 20% of connections with the earliest arrival time are selected. Along the way, this optimizes latency and does not filter nodes that will never be considered.

Step 1003: For the current node, examine all neighboring nodes.

Step 1004: Determine if the neighbor can be traversed (e.g., not closed).

If the neighbor is traversable:

Step 1005: If the neighbor is on the Closed List, it has already been evaluated, and there's no need to consider it again.

If the neighbor is not on the Closed List, proceed to the next check.

Step 1006: This check determines if the path from the start node to this neighbor node, going through the current node, is shorter than the previously known path to this neighbor (if one exists). This is typically determined by calculating a G cost (cost from the start node to the neighbor through the current node) and comparing it to the neighbor's existing G cost. All these costs are temperature-skewed.

If this new path's heuristic cost function F-cost is indeed smaller (or if the neighbor was not in the Open List to begin with, implying no known G cost)

Step 1007: Update the F-cost of the neighbor. The F cost is the sum of G (the cost to move from the starting point to the current node along the best-known path) and H (the estimated cost from the current node to the end node).

Step 1008: Change the parent of the neighbor node to the current node because a better path through the current node has been found. When a node (in this case, the neighbor) is being considered for inclusion in the path, the algorithm needs to keep track of the path that led to it. This is done by assigning the 'parent' of the neighbor node to the current node. The 'parent' indicates from which node the algorithm arrived at this neighbor. This helps reconstruct the path once the target node is reached. If a shorter path to the neighbor is found (meaning a path with a lower cost), the parent of the neighbor node will be updated to reflect this new, better path.

After recalculating the F cost and setting the parent for the neighbor node:

Step 1009: If the neighbor node is not already in the Open List, it must be added. This means this node has been discovered as a potential part of the path and must be evaluated later.

III. Middle-Mile Process:

The RL model governs the middle-mile process and encompasses training and prediction phases.

Figure 11:
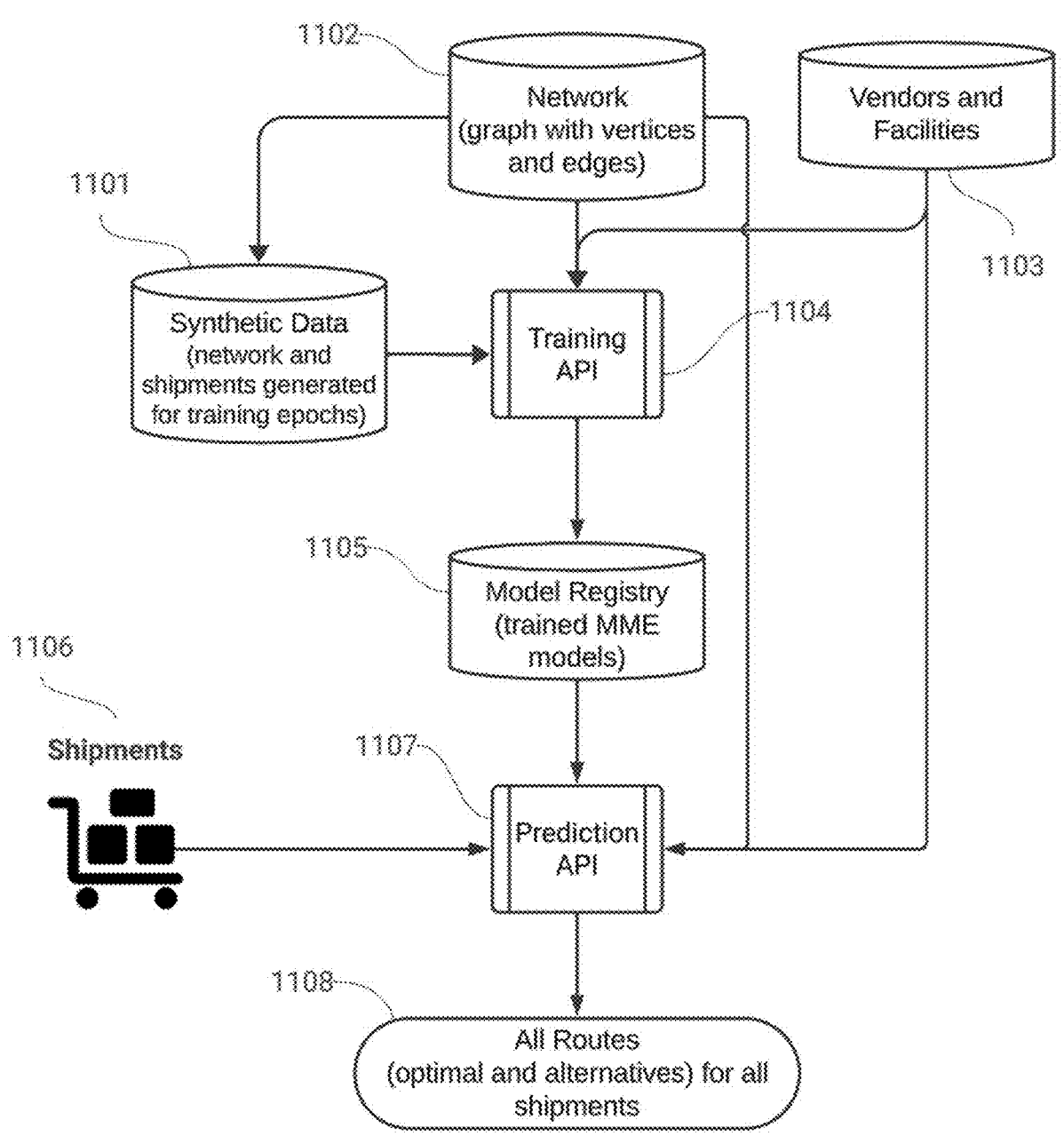
FIG. 11 illustrates a Multi-Agent Path Finding (MAPF) Framework.

The flowchart in FIG. 11 depicts a system designed for optimizing routing using machine learning models. This is a functional illustration. The shown APIs are included in an ML platform described in FIG. 18. Here's a detailed breakdown:

1. Step 1101: This initial data source consists of programmatically generated network and package data for training machine learning models through various epochs (iterations).

2. Step 1102: This represents a graph with vertices and edges, likely representing a logistics or transportation network where vertices are points like distribution centers, and edges are the routes between them. Edges have multiple characteristics, such as vendor temperature factors.

3. Step 1103: Another data source includes information about vendors and logistics facilities such as warehouses, distribution centers, or stores.

4. Step 1104: This application programming interface (API) is where the network and vendors' synthetic data and real-world data are inputted to train machine learning models. This API likely encapsulates the logic for model training processes, including the selection of algorithms, feature engineering, and optimization tasks.

5. Step 1105: The output of the Training API is stored in the Model Registry, hosting various versions and configurations of trained MME models.

6. Step 1106: Represents the items or consignments that must be routed through the network.

7. Step 1107: This API utilizes the trained MME models from the Model Registry to predict the optimal and alternative routes for all packages (shipments). It interfaces between the stored models and the real-time routing application, providing actionable predictions.

8. Step 1108: The final output of the Prediction API is a set of routes for all packages. This includes the optimal paths and alternative routes, which could be used for planning, resilience, or to provide choices in the logistics execution phase.

In more detail, the following elements play a role in the middle-mile prediction:

Training and Preprocessing Methodology—The importance of the network computation:

The system described herein is engineered for optimal performance in an environment characterized by a complex network of hubs (vertices) and connections (edges). This network forms the foundational structure for the training and operational processes of the system.

Network Composition and Preprocessing:

The network is initially input into the system in a raw form. A comprehensive preprocessing routine is executed to enhance computational efficiency and facilitate advanced analytical procedures. This includes:

Metadata Computation:

A thorough metadata computation is conducted before the training phase initiation. This metadata predominantly comprises graph metrics, such as maximum degree ('max_degree'), maximum number of neighbors ('max_neighbors'), and node ordering based on criteria like degree or number of neighbors. Other features that reflect the extremum values of the network are also computed. All the temperature factors are assigned to each connection based on the users' pre-processing rule determination process. This pre-computation is instrumental in accelerating subsequent processes.

The code includes several functions that manipulate and process graph data, likely representing a transportation or logistics network. The following is a breakdown:

1. Graph Max Time ('get_graph_max_time'):

Formula: Maximum value of departure or arrival times among all connections in the graph.

Explanation: This represents the latest time point (either departure or arrival) across all connections in the network, which is useful for scaling and normalizing time-related data.

2. Graph Min Time ('get_graph_min_time'):

Formula: Minimum value of departure or arrival times among all connections in the graph.

Explanation: This is the earliest time point in the network, serving as a reference or starting point for time-related calculations.

3. Graph Max Distance ('get_graph_max_distance'):

Explanation: It represents the longest distance between any two points in the network, which helps understand the geographical scope of the network.

Formula: Maximum distance value among all connections in the graph.

4. Graph Max Cost ('get_graph_max_cost'):

Formula: Maximum cost value among all connections in the graph.

Explanation: Indicates the highest cost associated with any connection, which can be important for budgeting and cost optimization.

5. Banned Origins and Destinations:

Formula: Lists nodes with no outgoing edges (for banned origins) and no incoming edges (for banned destinations).

Explanation: Identifies nodes that cannot function as origins or destinations in the network, possibly due to logistical constraints.

6. NormalizedDegrees for Sampling (Origins and Destinations):

Formula: Normalized inverse of the sum of in-degree and out-degree for each node.

Explanation: This metric is used to assign sampling probabilities to nodes, focusing on balancing the influence of nodes based on their connectivity.

7. Number of Nodes ('graph.number_of_nodes( )'):

Formula: Total count of nodes in the graph.

Explanation: Represents the size of the network in terms of the number of hubs or vertices.

Vectorization and Scaling:

To optimize the network for subsequent analytical tasks, a transformation process is undertaken where the network is converted from its original JSON or dictionary format into an array form. This vectorization is a step towards ensuring scalability and computational efficiency. Furthermore, the graph is scaled by adjusting all departure and arrival times based on the network's minimum time ('min_time'), thus standardizing time-related data.

Sample composite packages are generated, and their information is converted into state features. This, along with the graph, serves as the input state.

Temperature:

In the present invention, a novel application of an edge temperature factor to influence route decisions is introduced. This system leverages the graph transformation of traditional logistics networks (described in this section) and introduces a 'temperature' parameter.

This temperature parameter acts as a strategic biasing tool, altering the propensity to select specific edges during routing, thereby enabling a preferential treatment of certain vendors based on strategic needs or system preferences.

The proposes system offers two distinct methodologies for influencing edge selection:

1. Proportional Allocation: This method enforces exact proportion targets or quotas, making it ideal for scenarios demanding stringent adherence to pre-defined vendor utilization metrics.

2. Beta Distribution: Employed when routing decisions require flexibility and probabilistic biasing towards certain vendors. This method is especially beneficial when:

Preferences are dynamic or uncertain.

Continuous variables influence decisions.

The beta probability distribution function is as follows:

$$f(x; \alpha, \beta) = \frac{1}{B(\alpha, \beta)} x^{\alpha-1} (1-x)^{\beta-1}$$

$$B(\alpha, \beta) = \frac{\Gamma(\alpha)\Gamma(\beta)}{\Gamma(\alpha+\beta)} = \int_0^1 t^{\alpha-1}(1-t)^{\beta-1} dt$$

Samples are drawn from the beta distribution using the numpy random.beta function.

By default, the system leverages the beta distribution for decision-making, assigning each vendor an $(\alpha, \beta)$ tuple that shapes their respective beta distribution. This continuous probability distribution, defined on the interval [0, 1], is manipulated via these shape parameters to influence the likelihood of edge selection in favor of or against specific vendors.

When precise package distribution among vendors is mandated, the system uniquely combines the beta distribution with proportional allocation. Initially utilizing the beta distribution to establish baseline preferences, the system seamlessly transitions to proportional allocation when deviations from target distributions are observed. This hybrid approach ensures nuanced preference settings and strict adherence to distribution targets.

In proportional allocation mode, the proportion of packages served by each vendor is monitored by mini-batches to allow parallel processing and more efficiency. When a proportion $p_i$ for a vendor $V_i$ is below the target proportion target$_i$, the temperature factor is adjusted as follows:

$$\text{temperatureFactor}_i = 1 + k \cdot (\text{target}_i - p_i)$$

k is a parameter that is tuned. When a proportion $p_i$ for a vendor $V_i$ is above the target proportion target$_i$, the temperature factor is adjusted as follows:

$$\text{temperatureFactor}_i = 1 - k \cdot (\text{target}_i - p_i)$$

The operational mechanics of the system involve the following:

Sampling from the beta distribution to weigh edge selection factors.

In the RL case, multiplying either Q-values predicted by LightGBM models or the factor to minimize (this choice depends on the situation and the trade-off between latency and accuracy) with sampled temperature factors, thus influencing the final routing decision.

In the A* case, multiplying objective functions for A* agents with sampled temperature factors.

The system also incorporates a dynamic adjustment mechanism for the $(\alpha, \beta)$ tuples, aligning with vendor strategy or performance changes. Continuous monitoring of outcomes and feedback loops allows for fine-tuning the beta distribution parameters, ensuring the system's adaptability to evolving logistics requirements.

The invention is particularly advantageous in managing vendor performance and location preferences, offering a sophisticated, adaptable, and efficient approach to routing in complex logistics networks.

Figure 19:
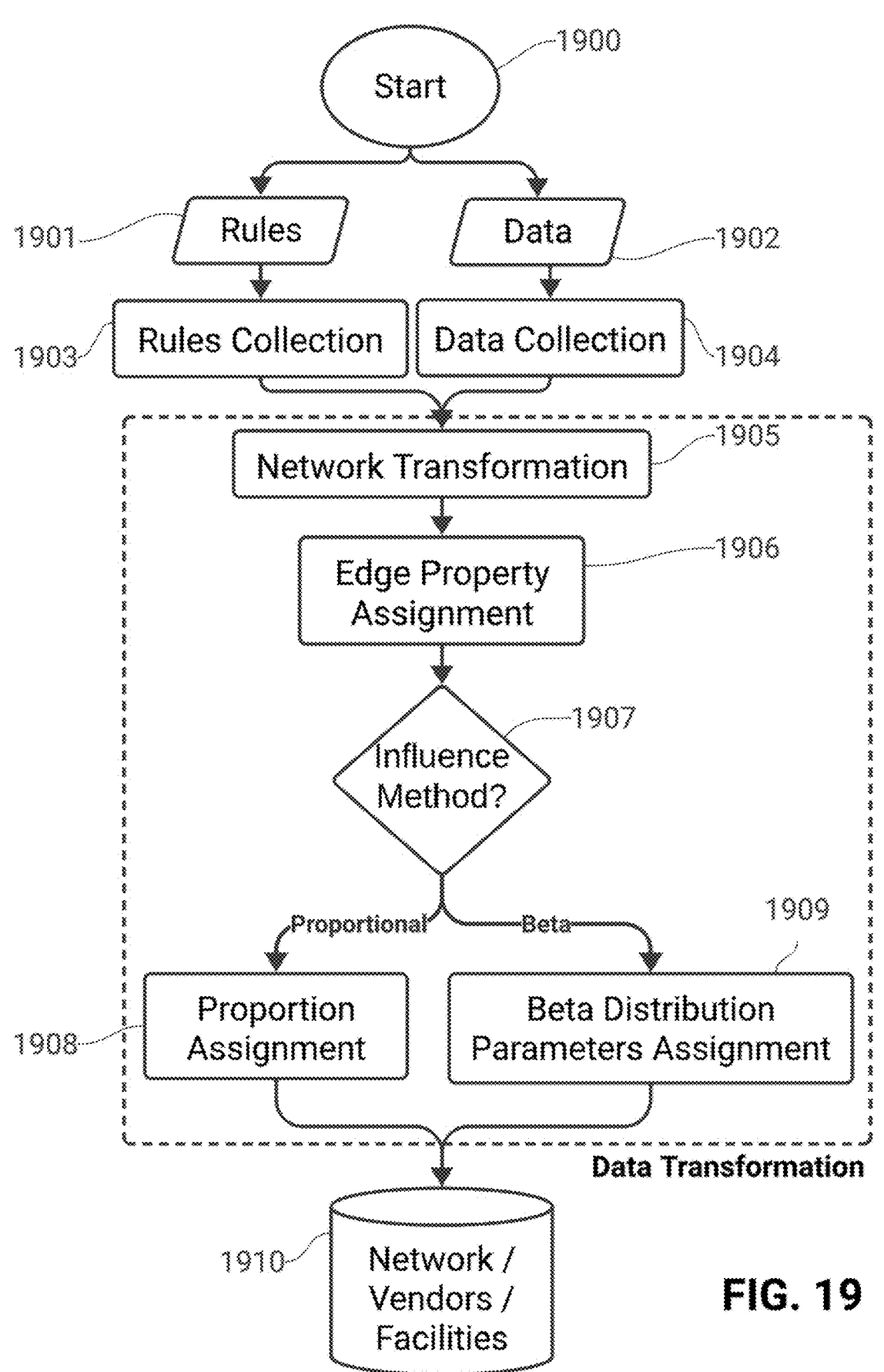
FIG. 19 illustrates how the temperature factors are configured during the data transformation phase.

FIG. 19 shows how the data transformation process from FIG. 1 works.

1. Step 1900: Initialize the routing system.
2. Steps 1901 and 1903: Upload rules for vendors.
3. Steps 1902 and 1904: Upload data on the network, facilities, and vendors.
4. Step 1905: Convert the logistics network into a graph representation.
5. Step 1906: Assign distance, time, cost, and temperature to each edge.
6. Step 1907: Determine Influence Method:
   Proportional Allocation Path: If strict proportion targets are required.
   Beta Distribution Path: If flexible, probabilistic edge selection is preferred (Default with $(\alpha, \beta)=(1, 1)$).
7. Step 1910: Assign each vendor a target proportion for package transportation.
8. Step 1909: Assign $(\alpha, \beta)$ tuples to each vendor.
9. Step 1910: The graph is stored.

State Feature Composition and Sampling Methodology:

In the proposed system framework, the generation and processing of state features are essential to operational efficacy. These state features and the graph data constitute the input state for the system's decision-making algorithms.

State Feature Elucidation:

Contrary to a simplistic interpretation, the state features encompass more than mere package information. They are an amalgamation of real-time package data juxtaposed against real-time network metrics. This integration offers a dynamic and comprehensive perspective of the operational environment. Critical components of these state features include (all these features are normalized by the maximum distance (see above), the maximum time (see above), and the maximum time respectively):

Distance to Destination: The geodesic distance from the current location of a package to its intended destination. This metric is crucial for route optimization and time management.

Time Left: The remaining duration before the promised delivery date or time for a package. This feature is essential in prioritizing packages and managing delivery schedules.

Current Time: The real-time timestamp, providing a temporal context to the state of the network and the packages within it.

Package Sampling Strategy:

A novel aspect of the proposed system is the method employed for sampling composite packages. This approach is characterized by a skewness towards package origins and destinations, which is determined based on the inverse of their respective node degrees ('1/node_degree'). This probabilistic model for sampling ensures a more representative and equitable selection of package origins and destinations, thereby enhancing the robustness and accuracy of the system's predictions and decisions.

The current policy dictates the next action, then updates the environment and policy based on the associated reward.

Prediction:

The trained model and package information are input into the system.

Methodology for Route Prediction and Flexibility:

The system's functionality includes the advanced mechanism for predicting the optimal route for package delivery. This process embodies the core innovative capabilities of the model, distinguishing it from conventional methodologies.

Advanced Predictive Model:

The model's predictive prowess extends beyond the traditional constraints often encountered in route optimization algorithms. Key attributes of this model include:

Cross-Graph Predictive Capability: unlike conventional schemes, the proposed model is not confined to the graph on which it was initially trained. It exhibits flexibility, allowing it to make accurate predictions on graphs that are structurally different from the training graph. This feature significantly enhances the model's applicability and utility across varied and dynamic logistical networks.

Performance Preservation: Despite the variability in the graph structures, the model maintains a high level of performance thanks to the generalization power of the RL agents (obtained thanks to the training phase where agents encounter more complex environments gradually with graphs having different in and out degrees for each vertex, making the task to find a shortest path more or less complex) and the hybrid approach where A* algorithm can solve a situation where the RL agents are blocked. This robustness ensures consistent and reliable route optimization across diverse network configurations. The performance is maintained when the temperature factors are used.

In addressing the challenge of maintaining consistent high-performance levels amidst varying graph structures, the multi-modal engine (MME) employs a combination of Reinforcement Learning (RL) agents and a hybrid algorithmic approach. This dual strategy preserves performance and ensures robust, reliable route optimization across many network configurations.

Generalization Power of RL Agents:

The core strength of MME's system lies in the exceptional generalization capabilities of its RL agents. These agents are trained in progressively complex environments, exposing them to graphs exhibiting a diverse range of in and out degrees for each vertex. Such training environments simulate varying levels of complexity in finding the shortest paths, thus equipping the RL agents with a profound ability to adapt and perform in unpredictable and varied graph structures.

This extensive training regimen enhances agents' problem-solving skills, ensuring they can generalize their learning to unseen graph configurations. As a result, regardless of the variability in the graph structures encountered in real-world scenarios, the RL agents maintain a consistently high level of performance. They adeptly navigate these complexities, applying their learned strategies to solve shortest-path challenges efficiently.

Hybrid Approach for Enhanced Problem-Solving:

Complementing the generalization power of the RL agents is MME's hybrid approach, which integrates the A* algorithm as a fail-safe mechanism. In scenarios where the RL agents encounter an impasse or a particularly challenging graph structure, the A* algorithm provides an alternative solution path. This algorithm, renowned for its efficiency in pathfinding and graph traversal problems, is a reliable backup, ensuring that MME's system can overcome any hurdles posed by complex network configurations.

The synergy between the adaptive intelligence of the RL agents and the deterministic problem-solving prowess of the A* algorithm constitutes a formidable combination. This hybrid approach not only enhances the system's overall problem-solving capacity but also ensures a vast generalization power. It enables MME to tackle various scenarios with unwavering efficiency and reliability.

Figure 9:
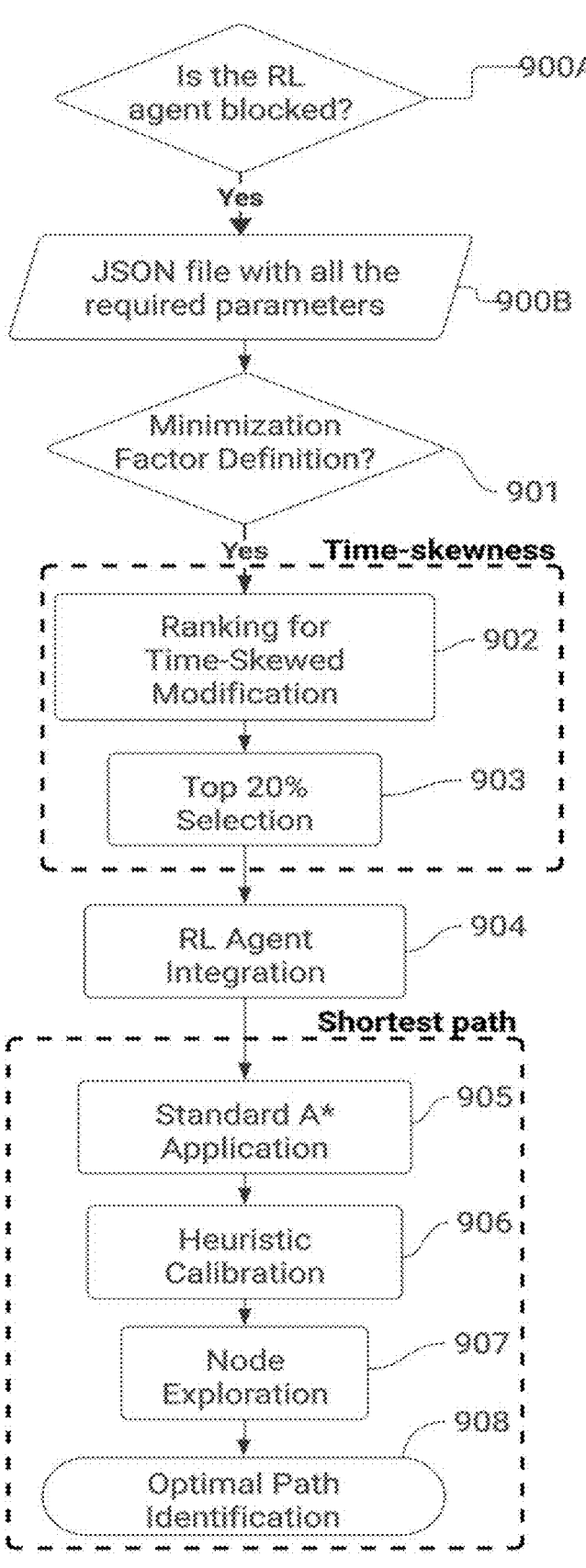
FIG. 9 shows how A* assists the RL model in its predictions.

When A* is required because the RL agent is blocked, the same factor to minimize as the RL agent is taken. The first step is time skewness. The A* algorithm is integrated into the path of the blocked RL agent. A* unblocks the situation via a traditional approach. In detail:

FIG. 9 shows how A* assists the RL model in its predictions.

Starting with determining if the RL agent is blocked (step 900A) and with the JSON file (900B), the algorithm performs Step 901. The algorithm initializes by defining the objective function, which by default is cost minimization. This function governs the search strategy of the algorithm. It can be distance, time, or carbon emission.

Step 902: The A* algorithm is modified to incorporate a time-skewed perspective. This adaptation prioritizes routes contributing to earlier arrivals at given hubs.

Step 903: The algorithm filters and focuses only on the top 20% of the earliest arriving connections at each hub, facilitating the quick movement of goods or passengers and mitigating delays.

Step 904: The time-skewed A* assists an RL agent, mainly when the agent lacks solutions or encounters a deadlock at a hub. The configurations used in the main problem are reproduced when available in the A* launch—temperature, for instance.

The following is a functional illustration of the A* algorithm principles. The details of how the temperature-driven and time-skewed A* algorithm work are gathered in FIG. 10.

Step 905: The algorithm adheres to the core principles of the A* algorithm, where it maintains a record of visited nodes to avoid re-exploration.

Step 906. Heuristic Calibration: A well-calibrated heuristic is applied, estimating the approximate cost from the current hub to the destination. This heuristic is crucial for guiding the search towards the most cost-effective route.

Step 907. Node Exploration: The algorithm explores potential paths using the heuristic and objective function, expanding its search from the most promising node.

Step 908. Optimal Path Identification: The modified A* algorithm identifies the optimal path that satisfies both the time-skewed requirement and the cost objective. This results in a solution that provides an expedient route to unblock the RL agent.

Figure 15:
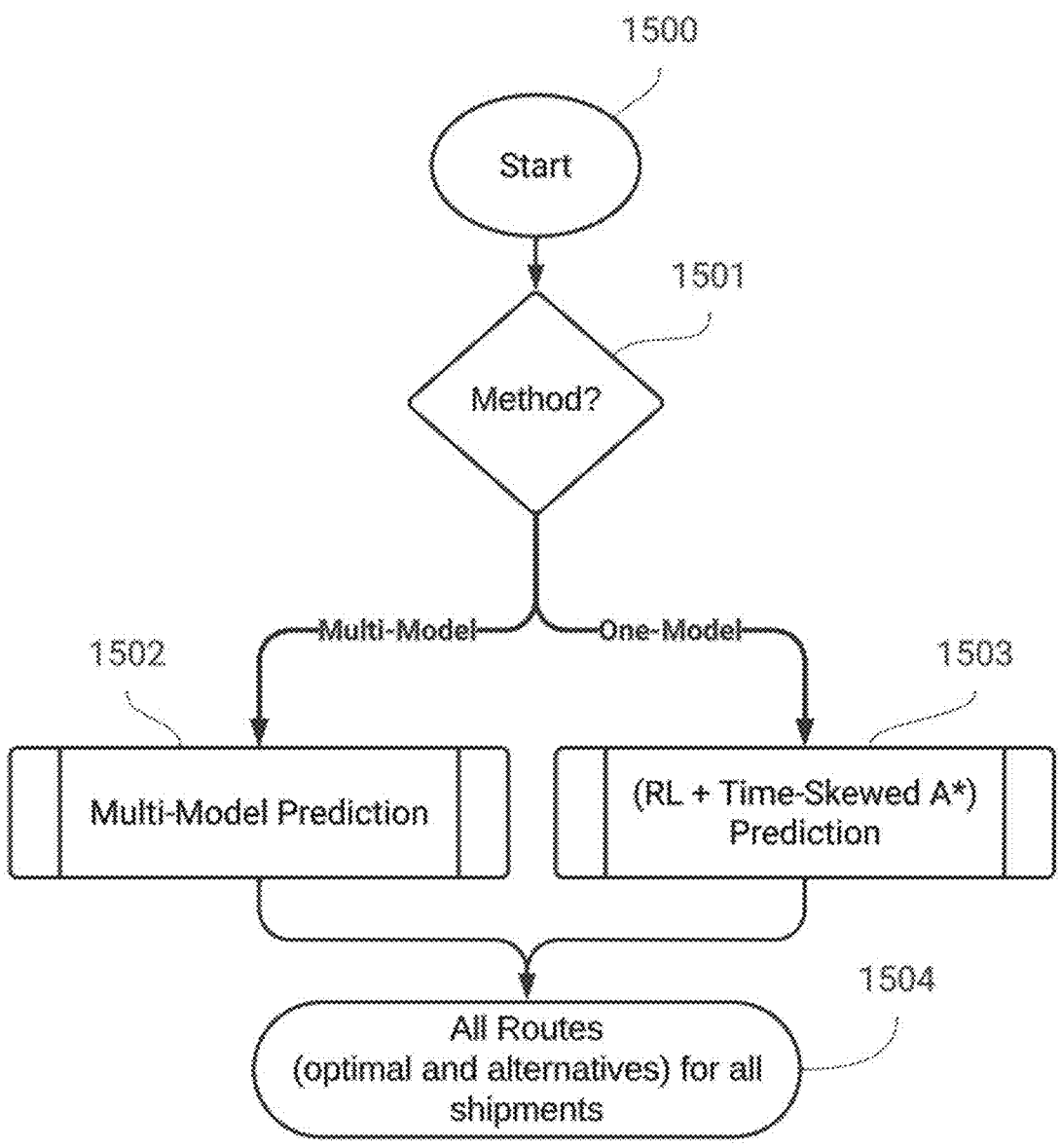
FIG. 15 shows the middle-mile prediction.

Multi-Model Approach for Enhanced Problem-Solving:

The flowchart of FIG. 15 represents a decision-making process for choosing a routing method a user can use and then determining package routes.

Here's a description of the flowchart:

1. Step 1500: This is the entry point of the process, where the decision-making begins.

2. Step 1501: This decision node asks which method to use for predicting routes. It's a branching point that leads to two distinct routing methodologies. The user chooses and makes the trade-off between the best result all the time at a higher latency and a faster result on average the best.

3. Step 1502: If the 'Multi-Model' branch is chosen, the system will use the 'Multi-Model Prediction' method (see FIG. 16).

4. Step 1503: Alternatively, if the 'One-Model' path is selected, a single, unified model is employed for the prediction. The single model combines the latest reinforcement learning (RL) version with a time-skewed variant of the A* search algorithm (Sec FIG. 9).

5. Step 1504: Regardless of the chosen method, the outcome is a set of routes for all packages. This includes the optimal and alternative routes, which could be used as contingencies or to provide options to the decision-makers.

Figure 16:
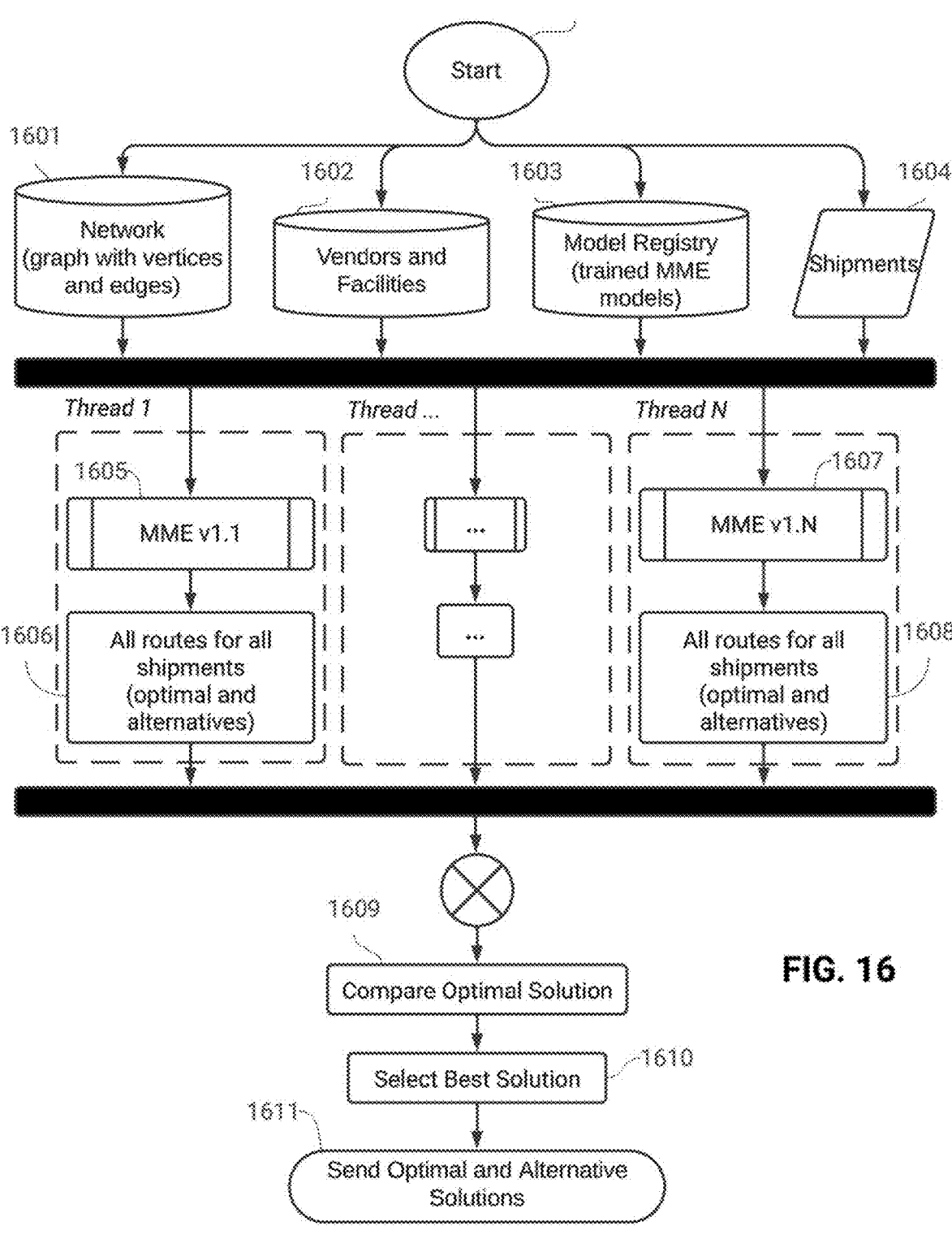
FIG. 16 illustrates how the multi-model approach for middle-mile prediction works.
Figure 17:
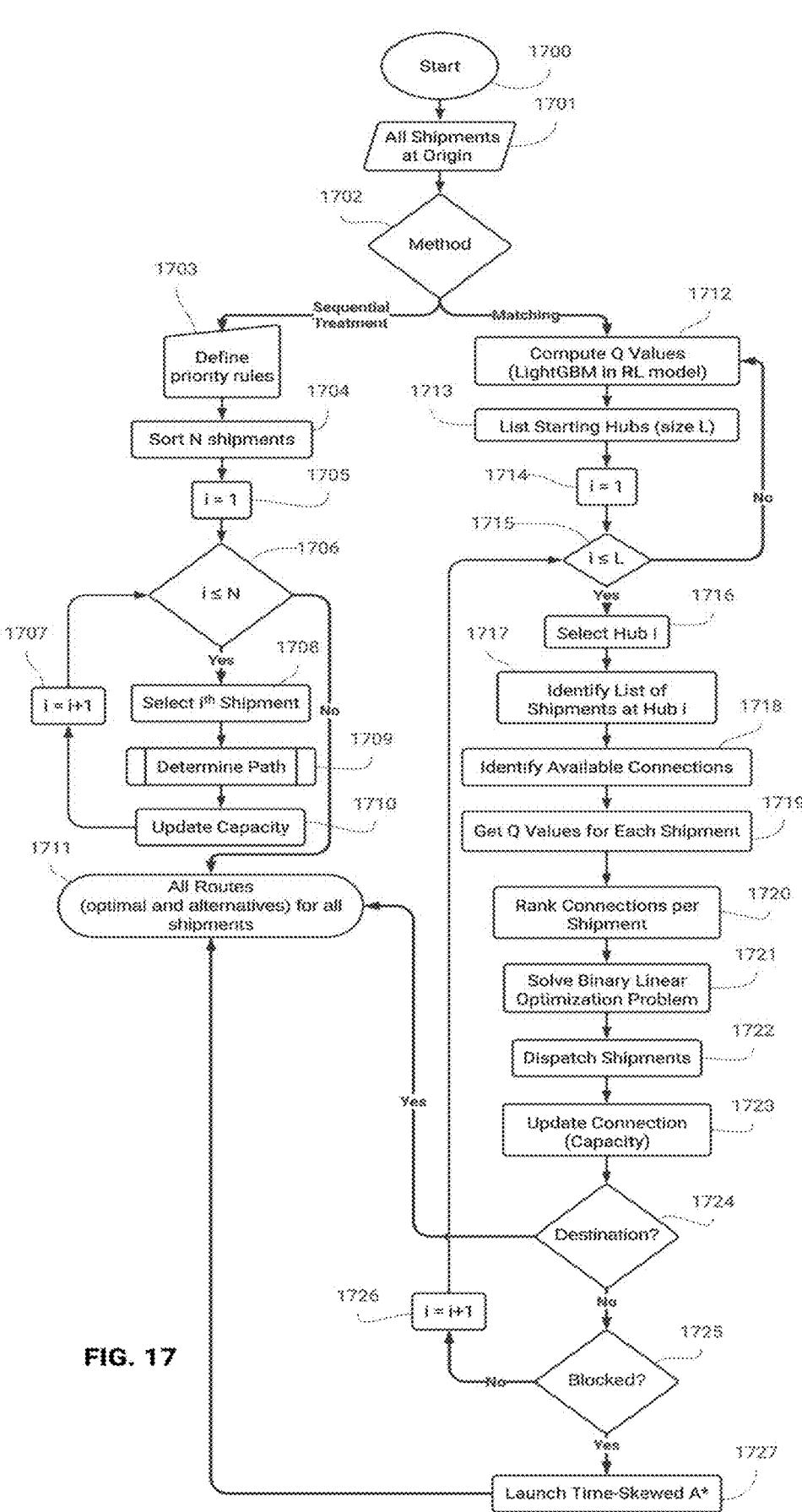
FIG. 17 illustrates how packages are processed in the system.

Now, the following description goes inside the Multi-Model approach:

The flowchart of FIG. 16 illustrates a system for routing packages using a multi-model approach where multiple versions of models are engaged to find the optimal routing solution. Here's a step-by-step description of the flowchart:

1. Step 1600: This is the initial step where the process begins.

2. Input Data Sources are handled as follows:

Step 1601: A database or input source containing the network's graph with vertices and edges representing the routes and connections in the transportation system. The temperature factors are also there.

Step 1602: Information about the vendors and facilities involved in shipping.

Step 1603: A repository of trained Multi-Modal Engine (MME) models that can be used for making routing predictions.

Step 1604: Details about the packages that need to be routed.

3. Processing Threads:

The system utilizes multiple threads (Thread 1 to Thread N) to process the routing simultaneously, improving efficiency and speed.

Each thread runs a version of the MME model (step 1605 in Thread 1, . . . , step 1607 in Thread N) to predict the routes for all packages. There is full flexibility to decide what each model is. The only purpose is to get enough diversity to get better results.

4. Routing Predictions:

Every thread outputs "All routes for all packages (optimal and alternatives)" (step 1606 in Thread 1, . . . , step 1608 in Thread N), indicating that each model provides a set of possible routes for the packages, including the optimal route and alternative routes.

5. Comparison and Selection of Best Solution:

Step 1609: Each model's optimal solutions are compared to determine which model offers the best routing option.

Step 1610: After the comparison, the best solution is selected based on predefined criteria, which could include factors like cost, time, distance, or carbon emissions.

6. Output:

Step 1611: The system then sends out the selected optimal and its alternative solutions. This could be for further processing, or it could be sent to logistics managers for implementation.

This system is designed to utilize diverse models to compute routing for packages, thereby not limiting the problem-solving to only one RL Q-learning model. Instead, it allows for using various models that may employ different algorithms suitable for other aspects of the routing problem. The benefit of this approach is that it can harness the strengths of multiple models to achieve a more reliable and efficient routing solution. The flowchart reflects a robust, adaptable system that handles complex logistics and supply chain management routing scenarios.

Implications for Route Optimization:

Integrating these advanced techniques in MME's architecture provides a consistently high level of route optimization. It guarantees that regardless of the variability and complexity of the network configurations encountered, the system can generate optimal routing solutions. This robustness is not merely a technical achievement but a practical assurance to users that MME can handle the diverse challenges inherent in real-world logistics problems.

Thus, MME's combination of advanced RL agent training for broad generalization and its hybrid approach, incorporating the A* algorithm, collectively endow the system with remarkable adaptability and problem-solving capabilities. This dual strategy is instrumental in ensuring that MME stands as a robust, versatile, and reliable solution in the dynamic field of routing optimization.

Alternative Route Suggestions: Beyond identifying the single most optimal route, the model is equipped to generate alternative route suggestions. This capability provides a spectrum of viable options, catering to logistical operations' dynamic and sometimes unpredictable nature. Including alternative routes empowers decision-makers with additional strategic choices, enhancing operational flexibility and adaptability. Alternatives are optimal route predictions assuming that one of the connections in the optimal path is unavailable.

If the RL agent encounters an impasse, the A* algorithm is invoked to resolve it.

The present application proposes a novel approach for deriving alternative routing strategies in an end-to-end package transportation system. This system is engineered to not only ascertain the most optimal route for each package's journey—encompassing initial, intermediary, and final transit phases—but also to generate and propose viable alternative routes.

To achieve this, masking or filtering techniques can be employed and integrated into the network analysis, which is rooted in sensitivity analysis methodologies. This technique operates on the premise of network capacity invariance post-optimal route determination.

Technical Specification of Alternative Route Generation: Upon identifying an optimal route within the network, the model assumes that this route selection does not alter the overall capacity of the transportation network. Subsequently, for each individual connection that constitutes part of this optimal route, the model implements a hypothetical scenario-a 'masking' of sorts. In this scenario, the specific connection is treated as temporarily non-operational or 'shut down' within the network context. Following this masking, the system re-engages its route prediction algorithm, now operating on a modified network version that excludes the masked connection. This process results in the generation of an alternative optimal route that circumvents the previously selected path. This iterative masking and re-prediction process is repeated for each connection in the initial optimal route, thereby yielding a comprehensive set of alternative routing solutions.

These alternative routes are then cataloged and made available to dispatchers, offering them a range of strategic options to enhance the flexibility and efficiency of package transportation. This methodology increases the robustness of the route optimization process and ensures higher adaptability in dynamic and unpredictable logistical environments.

IV. RL Model Specifications:

The state features include distance to the destination, time remaining compared to the expected arrival, and the current time. They are all normalized. The action features encompass the new distance to the destination (normalized), normalized duration, a boolean indicator denoting proximity to the destination, normalized arrival time for the chosen route, the size of the next hub (normalized), normalized connection cost, and a boolean indicating arrival at the destination. The RL model employs Q-learning, with the lightGBM algorithm computing values for each connection at every hub, with the optimal connection being selected at each step.

Figure 12:
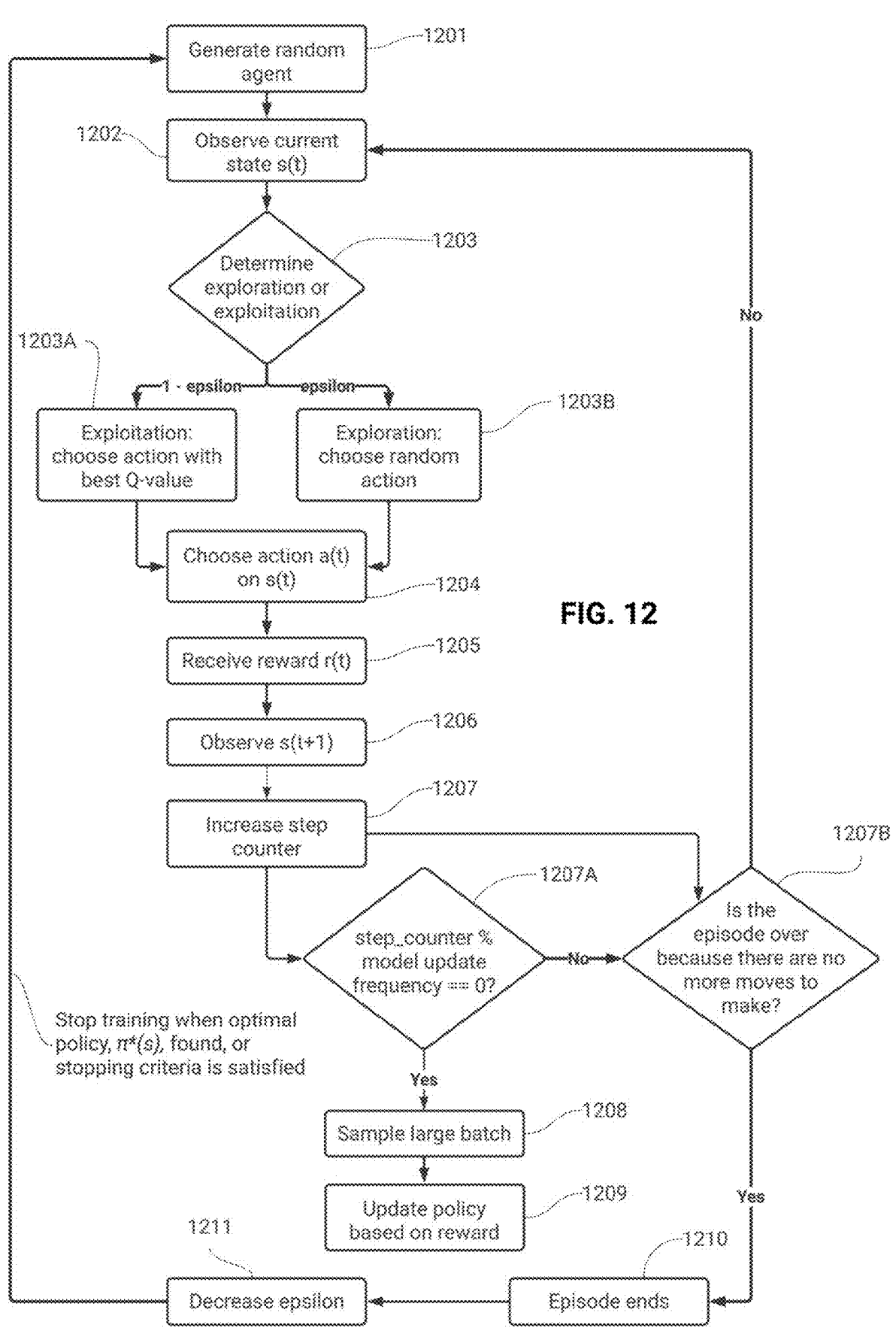
FIG. 12 illustrates the implementation of the Q-learning algorithm.

The Q-Learning Approach:

FIG. 12 illustrates the implementation of the Q-learning algorithm. The overall process is as follows:

The Q-learning process begins with the initialization of a learning agent. This agent interacts with an environment by observing states, selecting actions, receiving rewards, and updating its policy based on the experiences. It navigates the decision-making process using an epsilon-greedy strategy, gradually shifting from exploration to exploitation through a Gaussian function to decrease epsilon over time. The goal is to learn an optimal policy that maximizes the cumulative reward.

Detailed Process with Added Features and Update Rule:

1. Step 1201: The agent is initialized with random or baseline policy values, ready to start learning.

2. Step 1202: The agent observes features of the current state, including distance to destination, time left, and current time.

3. Step 1203: Using an epsilon-greedy approach, the agent decides whether to explore by choosing a random action or to exploit by selecting the action with the best-known Q-value.

Step 1203A: Choose the action with the highest Q-value, given the current state features.

Step 1203B: Select an action randomly, allowing the agent to gather diverse experiences.

4. Step 1204: The action taken involves "Taking a connection," with features such as new distance (normalized), normalized duration, boolean checks for proximity to the destination, normalized arrival time, next hub size (normalized), normalized cost of connection, and other relevant normalized distances and costs.

5. Step 1205: After acting, the agent receives a reward, i.e., a feedback mechanism for learning.

6. Step 1206: The agent observes the next state, which includes the updated features (after taking the action).

7. Step 1207: This counter tracks the number of steps taken, which is used to determine policy update intervals.

Step 1207A: The agent checks if it's time to update the model according to a predefined schedule.

Step 1207B: The agent assesses if the episode has concluded, which can happen upon reaching the destination or exhausting possible actions.

8. Step 1208: A large batch of experiences is sampled for policy updates, typically from an experience replay buffer.

9. Step 1209: The Q-function is updated using the following rule (Bellman equation): $Q\_new(s(t), a(t)) \leftarrow Q(s(t), a(t)) + alpha \cdot [r(t) + gamma \cdot max\_a\ Q(s(t+1), a) - Q(s(t), a(t))]$ Here, alpha is the learning rate, gamma is the discount factor, and $max\_a\ Q(s(t+1), a)$ is the maximum Q-value for the next state across all possible actions.

10. Step 1210: Epsilon, which determines the exploration-exploitation balance, is decreased using a Gaussian function to promote more exploitation as the agent learns gradually.

11. Step 1211: Training ceases when an optimal policy is found or other stopping criteria, such as a maximum number of steps or episodes, are satisfied.

Figure 13:
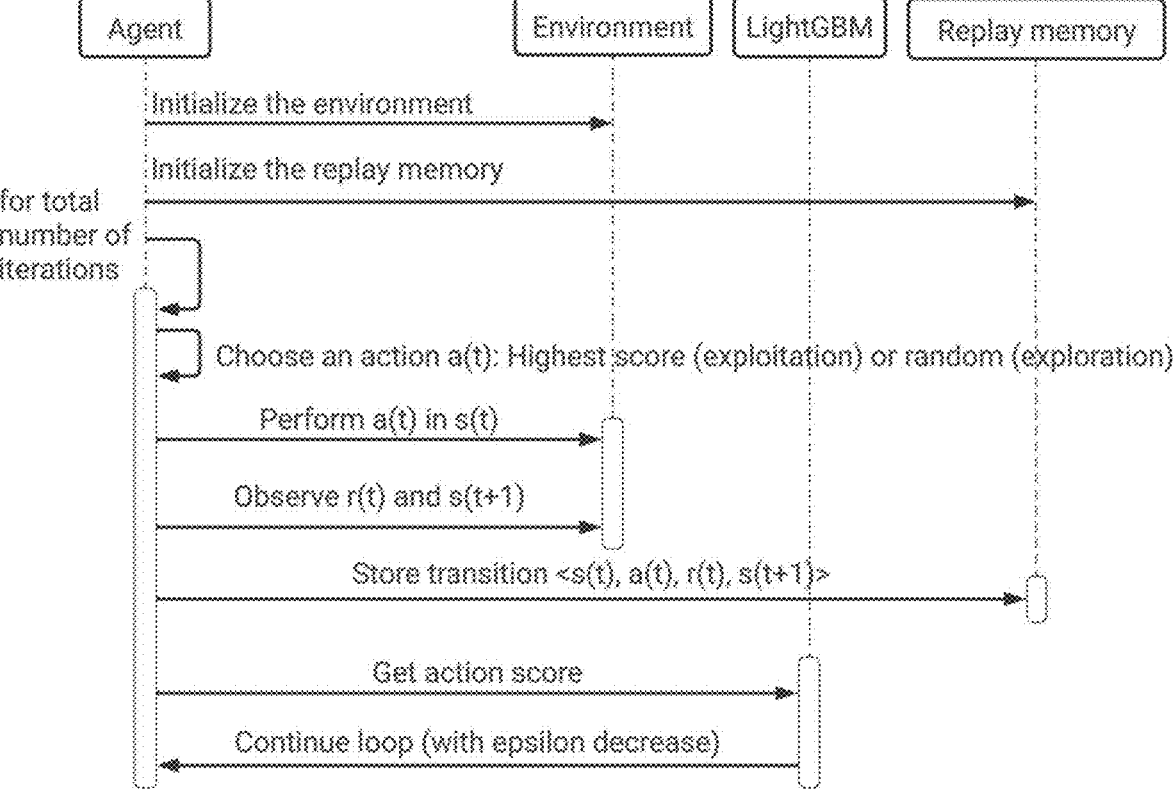
FIG. 13 shows the Reinforcement Learning Model using LightGBM.

Note: The state space includes all possible states the agent can occupy, the action space encompasses all actions the agent can execute, and the observation space comprises the perceivable environment factors considered when deciding the next move. This setup allows the agent to learn effectively from the environment to make strategic decisions towards its goals. Using LightGBM instead of a traditionally used neural network:

FIG. 13 shows the Reinforcement Learning Model using LightGBM.

The proposed method for approximating Q-values in the reinforcement learning system uses a gradient boosting framework, specifically LightGBM. This method introduces an experience replay mechanism to enhance learning efficiency and stability by utilizing past experiences stored in a replay memory for the iterative training of the Q-value approximator.

Detailed Description is as follows:

1. Initialization:

An environment is initialized to define the state and action space within which the agent operates.

A replay memory is created to store past state-action-reward-state transitions (experience pool), which will be used to train the LightGBM model. This step also populates the replay memory with random moves until the buffer is filled.

2. Operation:

The agent operates in the environment over a total number of iterations, discretely learning and updating its policy. A counter tracks the number of steps taken, which is used to determine policy update intervals. The agent checks if it's time to update the model according to a predefined schedule.

3. Action Selection:

In each iteration, the agent chooses an action a(t) based on either the highest Q-value score computed by LightGBM (exploitation) or a random action (exploration) to balance the trade-off between exploiting known good actions and exploring new ones.

4. Action Execution and Observation:

The chosen action is performed in the current state s(t), and the agent observes the reward r(t) and the new state s(t+1).

5. Experience Storage:

The tuple <s(t), a(t), r(t), s(t+1)> representing the experience is stored in the replay memory.

6. Q-value Approximation:

The LightGBM model is trained using the experiences from the experience pool to approximate the Q-values. LightGBM is a gradient-boosting framework that uses tree-based learning algorithms designed for distributed and efficient training.

7. Action Score Retrieval:

After training, the LightGBM model provides an action score, the Q-value for possible actions from the new state s(t+1). This score may be temperature-skewed (if this strategy has been chosen versus skewing the factor to minimize).

The process loops, with the agent now in state s(t+1), ready to select the next action and continue the learning process. Epsilon, which determines the exploration-exploitation balance, is decreased using a Gaussian function to promote more exploitation as the agent learns gradually. Using dynamic training instead of standard training methods:

8. Loop:

FIG. 14 illustrates dynamic training, i.e., a progressive training method for Q-Learning on graph-based decision systems with economic stopping criteria.

This method introduces an advanced approach for progressively training Q-learning models on graph-based decision systems, significantly expediting the training by strategically enlarging the graph through sequential stages and employing an N-secretary stopping strategy for intermediate training rounds to select high-performing models probabilistically. This method ultimately ensures the derivation of an optimal policy through evaluation in the final training round.

In detail:

1. Dynamic Training Process:

After start (step 1400), the environment is initialized (step 1401). Initiate with a base graph of 10 nodes and progressively increase the graph size for model training, extracting subgraphs by selecting the top n nodes with the highest degree from the entire graph.

If the graph size is less than the final size (step 1402), Model training phases incrementally expand, adhering to stepwise a increase formula: 10+(final_size−10)/(k−1), with k representing the total training steps and thus the number of subgraph sizes (step 1403). The dynamic training steps selection is automated by bucketizing based on the graph size. For instance, for graph size lower than 10, k=1. For graph size in (10, 60], k=2. This bucketization may be tuned.

Models evolve through each phase, with the model from one phase serving as the seed for the next, culminating in a final graph size training.

2. Intermediate Training Rounds (step 1404) with N-Secretary Stopping Criteria:

The N-secretary strategy, set at a stopping point of N checkpoints (e.g., 15), guides intermediate training, where training ceases once a model exceeds the performance of the best model among the initial 20 checkpoints. (step 1406).

This method draws on economic theory, predicting an optimal candidate's 37% selection chance, thereby not significantly affecting subsequent training rounds, even if the absolute best model is not chosen.

Models are validated against a fixed validation set, newly determined at each round, ensuring the best model's performance is retained before the cutoff at 15 and continuing until a subsequent model surpasses it, or a maximum episode threshold is reached.

3. Performance Comparison of Intermediate Models:

Comparative evaluations between two models, m1 and m2, prioritize metrics like on-time delivery and cost efficiency.

Secondary metrics, such as duration, distance, and cost, are employed to discern the overall superior model when primary metrics are inconclusive.

4. Final Round Training and Stopping Criteria:

Training during the final round (step 1405) persists until reaching the 'convergence flat zone' (step 1407), an indicator that all potentially optimal models have been explored.

While intermediate rounds depend on the N-secretary policy for termination, the final round utilizes a robust episode convergence metric.

The culmination of the final round leaves multiple top-tier model versions, equivalent to the number of training steps defined by k, all of which are tested against an unknown dataset for performance comparison.

The superior model is deemed 'final,' with ties broken by performance metrics from the validation set employed during training. (step 1408).

This progressive training methodology leverages subgraph selection and economic stopping criteria to efficiently train and select Q-learning models, ensuring robust performance in graph-based decision-making applications. Having thus described a preferred embodiment, it should be apparent to those skilled in the art that certain advantages of the described method and apparatus have been achieved.

Using Two Low Latency Methods to go Multi-Agent Sequential Treatment Method (Time-Independent Approach)

Overview: This approach involves handling packages in a predetermined order. Each package is individually routed using a deterministic (A*) or stochastic (RL, RL+A*) algorithm for a single package problem. After routing a package, the capacities of the utilized connections are updated to reflect the system's current state.

Key Steps:

1. Package Selection: The method starts by selecting the first package from a sorted list of available packages.

2. Path Determination: An optimal or near-optimal path is computed for each selected package. This computation considers the network's current state, including all connections' capacities and temperature.

3. Capacity Update: After routing a package, the capacities of the used connections are decreased accordingly. If a connection reaches zero capacity, it is no longer available for subsequent packages.

4. Sequential Processing: This process is repeated for each package in the sequence until all are handled.

Ordering Criteria:

The sequence in which packages are processed is crucial. A common criterion is to sort packages based on their latest arrival time.

Customization is possible, where a company can integrate other factors into the priority function determining the package order.

Matching Method (Time-Dependent Approach)

Overview: This approach involves more dynamic and automated handling of packages, particularly at each hub. It aims to maximize overall satisfaction by optimally dispatching packages at each hub.

Key Steps:

1. Hub Arrival: Upon the arrival of a vehicle at a hub, the system considers all onboard packages and available connections from that hub.

2. Step 1719: Each package calculates the Q-value for its potential next action for each available connection.

3. Step 1720: Packages rank the connections based on their Q-values. This ranking is unique for each package, as it depends on the package's properties, such as destination hub and latest arrival time.

4. Optimization Problem is framed as follows:

$$\min \Sigma_{a\in A, b\in B} P_{a,b} \cdot x_{a,b}$$

subject to:

$$\Sigma_{b\in B} x_{a,b} = 1; \; \forall a \in A \tag{1}$$

$$\Sigma_{a\in A} v_a x_{a,b} \le c_b; \; \forall b \in B \tag{2}$$

where: $x_{a,b} \in \{0, 1\} \forall (a, b) \in A \times B$

A={packages}

B={edges}

$P_{a,b}$ is integer rank given to $b \in B$ by $a \in A$ $P_{a,b} = 1$ for max Q-value, and increases by 1 with decreasing Q-value $v_a$ is the size of a (volume, weight, etc.)

$c_b$ is the max capacity of b

Objective $P_{a,b}$: To dispatch packages to maximize overall satisfaction.

Variables: Binary variables $x_{a,b}$ representing whether a package is dispatched on a particular connection.

Constraints: Ensuring each package is dispatched on exactly one connection (1) and that the capacities of connections are not exceeded (2).

Solution Method: Solved as a linear binary optimization problem using algorithms like the one in Hexaly's LSP language, similar to the Glyde solver.

Both methods leverage the strengths of RL and temperature-skewed LightGBM-generated Q values but apply them differently. The time-independent approach offers simplicity and predictability, suitable for scenarios where user-defined rules and priorities are crucial. In contrast, while more complex, the time-dependent approach provides dynamic optimization that can adapt to changing conditions and aims to maximize overall efficiency and satisfaction in the system.

Figure 18:
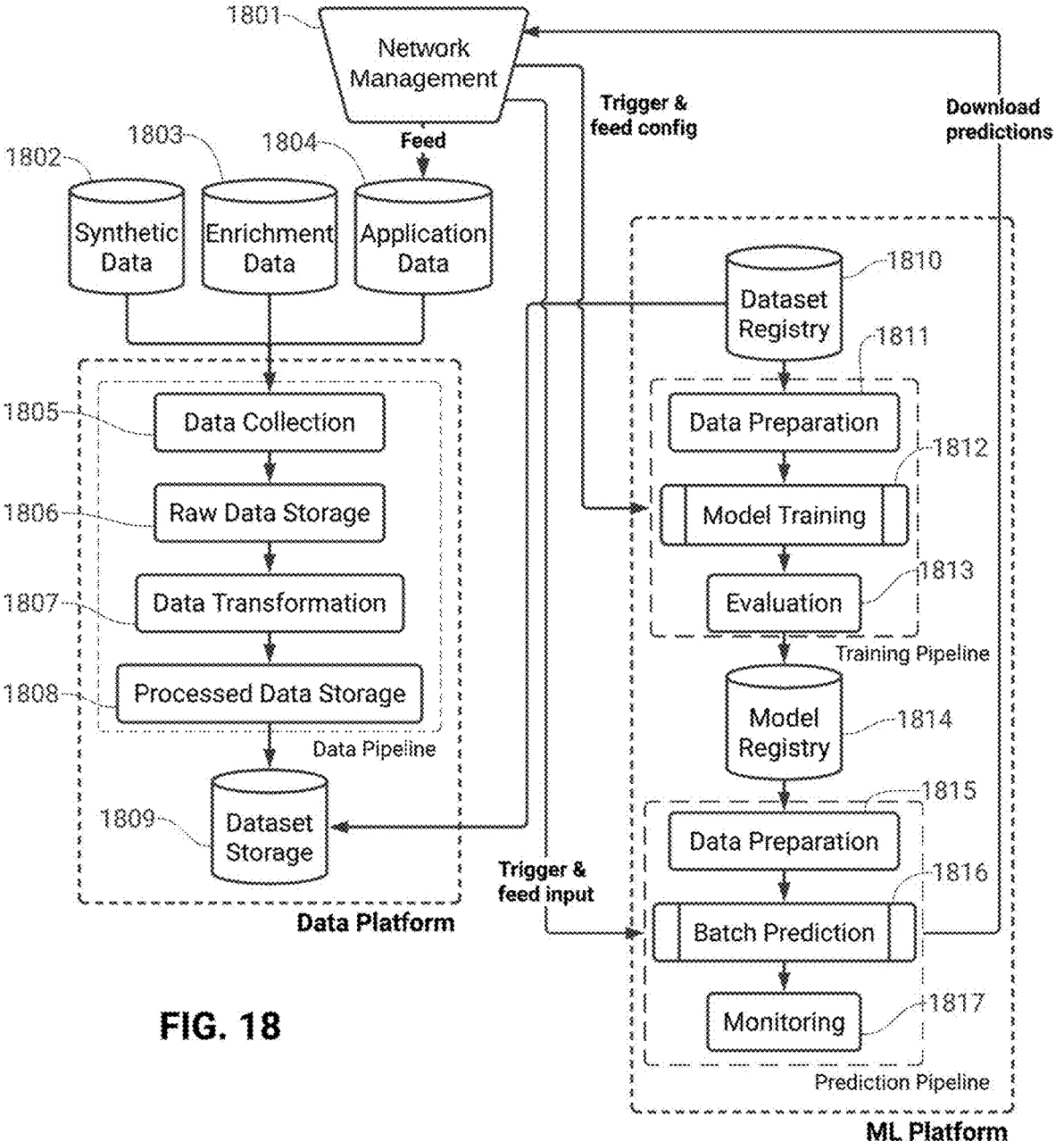
FIG. 18 shows the ML platform used to implement the application.

Using an in-house ML platform for low costs and latency:

FIG. 18 shows the ML platform used to implement the application. The flowchart of FIG. 18 illustrates the architecture of a machine learning (ML) platform integrated with a data platform designed to train and serve the routing models. Below is a detailed description of the components and flow.

Data Platform Components are as follows:

1. 1801: This module works as the starting point for data ingestion, handling the network feed management and trigger configurations.

2. Data Sources (1802-1804): There are three distinct data sources:

Synthetic Data (1802): Data generated programmatically to simulate real-world scenarios.

Enrichment Data (1803): Supplementary data used to enhance the quality or context of the primary data.

Application Data (1804): Actual data generated from applications, potentially user or transaction data.

Data Platform Pipeline (1805-1809):

3. 1805: The process of collecting data from different sources.

4. 1806: The initial repository where collected data is stored in its raw form.

5. 1807: The stage where raw data is processed and transformed into a format suitable for analysis and modeling.

6. 1808: Storage of the transformed data, now ready for use in training and predictions.

7. 1809: The final storage for datasets that are now ready to be fed into the ML training pipeline.

ML Platform Components:

8. 1810: A catalog or repository where datasets are registered and managed.

9. 1811: Preprocessing and cleaning data to make it suitable for feeding into the ML model.

10. 1812: The process of training the ML model using the prepared datasets.

11. 1813: Assessing the performance of the trained models against a validation set or via cross-validation.

12. 1814: A storage for trained models, where they are versioned and managed for deployment.

13. 1816: Using the trained models to make predictions on a batch of data.

14. 1817: Once deployed, ongoing tracking of the model's performance and health.

Training Pipeline (1812-1814):

This encompasses the model training and evaluation process, starting with the data preparation and culminating in storing the evaluated model in the model registry.

Prediction Pipeline (1815-1817):

This involves preparing data for predictions, making batch predictions, and monitoring the models' performance.

ADDITIONAL NOTES

The dashed lines denote logical separations between different components and stages.

"Trigger & feed config" and "Trigger & feed input" suggest mechanisms for initiating processes or data flow, which could be event-driven or scheduled.

"Download predictions" implies an interface or functionality for end-users to access the prediction results.

The architecture emphasizes modularity and separation of concerns, with clear demarcations between data handling, model management, and operational processes, reflecting a systematic approach to deploying ML models.

Figure 20:
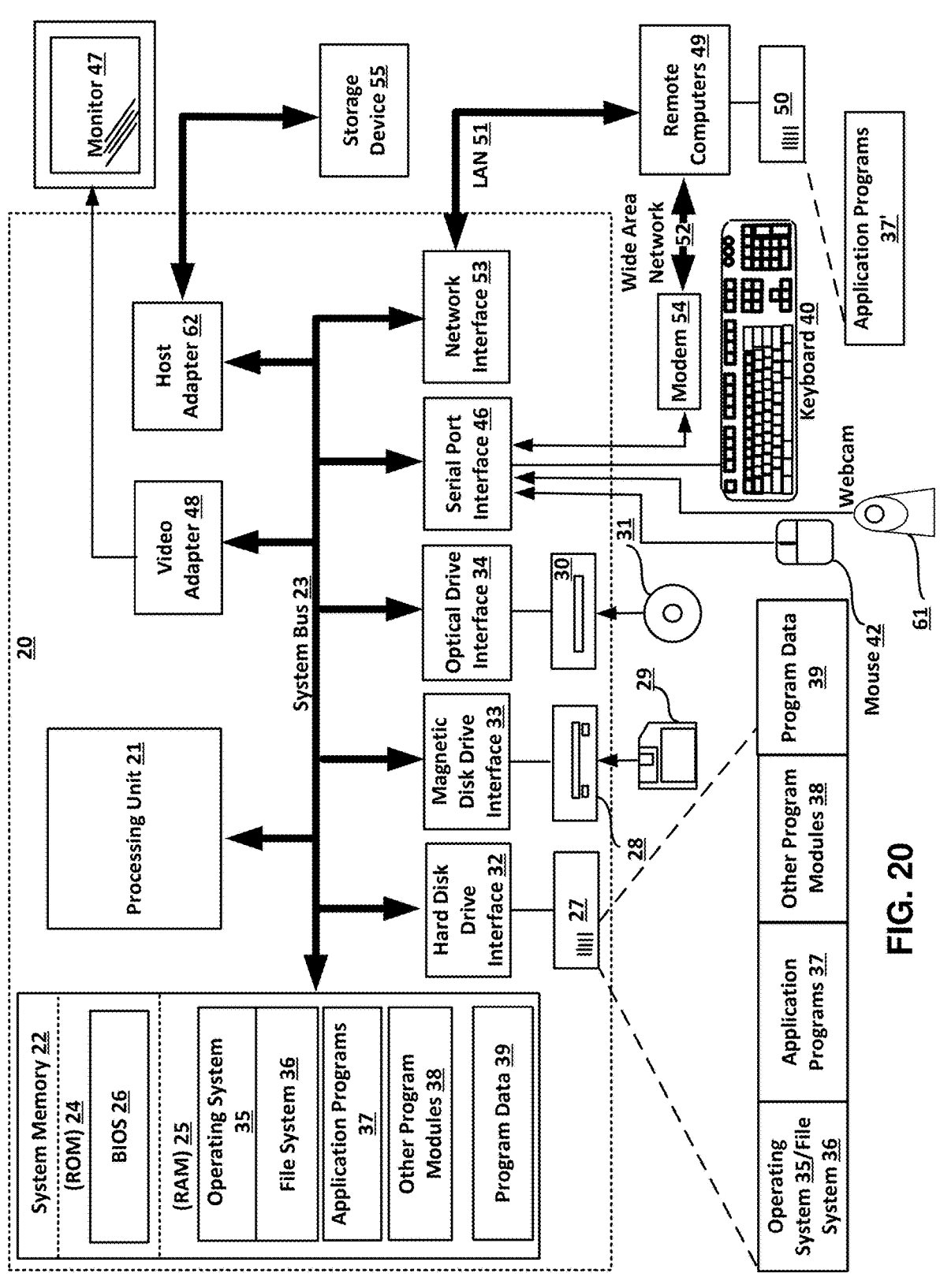
FIG. 20 shows an exemplary computer or server that may be used to implement the invention.

With reference to FIG. 20, an exemplary system for implementing the invention includes a general purpose computing device in the form of a host computer or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40, a webcam 61 and pointing device (e.g., a mouse) 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 62 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

It should also be appreciated that various modifications, adaptations, and alternative embodiments thereof may be made within the scope and spirit of the present invention. The invention is further defined by the following claims.

What is claimed is:

1. A method for managing package delivery logistics, comprising:
   training a Reinforcement Learning (RL) agent by
   i. executing sequential stages of expanding graph scope from central hub-centric subgraphs to a full network, with nodes selected based on centrality ranking;
   ii. training the RL agent sequentially across each stage using Q-learning with LightGBM (Light Gradient-Boosting Machine)-based function approximation, wherein each completed stage initializes a subsequent stage;
   iii. applying N-Secretary stopping criteria to intermediate training rounds by selecting a baseline performance and terminating the training when the RL agent's performance probabilistically exceeds the baseline performance; and
   iv. deploying the RL agent into a registry with warm-start capability for continued training;
   inputting a set of package sources and package destinations;
   converting the package sources and the package destinations into a set of addresses representing geospatial coordinates;
   identifying vendors who will pick up the packages from their sources based on multi modal cost;
   inputting a network of hubs and connections and converting the network into a graph where the hubs are represented by vertices and the connections are represented by edges;
   for each package, identify a first hub to which the vendors will deliver that package;

using the trained RL agent from the registry to determine an optimal path for each package to transport the package from a first hub to a last hub when no deadlock occurs;

identifying vendors who will pick up the packages from their last hubs and deliver the packages to the package destinations;

wherein, when the RL agent is deadlocked, the trained RL agent is complemented by a time-skewed A* algorithm to find a valid path and resolves the deadlock—by computing an alternate sub-path around the deadlock to a feasible hub, incrementally replanning only a portion of the optimal path that bypasses the deadlock, thereby avoiding a full recomputation of the optimal path, wherein the RL agent takes into account path distance between the package sources and the package destinations, total time that a package is in a vehicle and time inside a hub, and cost of moving the package from a first depot to a last depot; and dispatching the vehicles of the vendors to pick up and deliver the packages based on the optimal path.

2. The method of claim 1, wherein to enable training of the RL agent and prediction of the optimal path, (1) the graph is scaled by adjusting all departure and arrival times based on a minimum time of the network, (2) metadata that includes graph metrics, including any of maximum degree, maximum number of neighbors, and nodes ordering, is computed, (3) the network is vectorized into an array form, and (4) each connection has vendor characteristics related to their priority and user-defined rules.

3. The method of claim 1, wherein the hybrid model handles packages one by one in a predetermined order or together via a matching algorithm, wherein each package is individually routed, while taking into account capacity of vehicles delivering the packages.

4. The method of claim 1, wherein the hybrid model handles packages together via a matching algorithm to optimize overall network resources by optimally dispatching packages at each hub, and wherein the hybrid model, after routing each package, up dates capacities of the graph edges to reflect a current state of the network.

5. The method of claim 1, wherein calculating the optimal path includes determining an optimum set of vendors who will pick up and deliver the packages, while minimizing a number of tours, distance, travel time, waiting time, span, end time, routing costs, and carbon emissions.

6. The method of claim 1, wherein the optimal path includes an optimized set of vendors who will deliver the packages to the destinations, the optimized set of vendors minimizing the number of tours, distance, travel time, waiting time, span, end time, routing costs, and carbon emissions.

7. The method of claim 1, wherein time and distance matrices are computed for each type of vehicle from a different configuration by utilizing multiple networks, such that different speeds, traffic conditions, and/or tolls or highway restrictions are used for each vehicle.

8. The method of claim 1, wherein the hybrid model considers vehicle types, cost, capacity, speed, traffic, carbon emissions, and demand.

9. The method of claim 1, wherein the sequential stages of expanding graph scope utilize a composite package sampling that is skewed towards package origins and destinations, which is determined based on an inverse of their respective node degrees ('1/node_degree').

10. The method of claim 1, wherein the N-secretary stopping strategy for the intermediate training rounds probabilistically selects high-performing models for the registry.

11. The method of claim 1, wherein the A* algorithm incorporates time-based schedules of each connection into the process of determining the optimal path.

12. The method of claim 1, wherein the hybrid model uses an isochrone approach to generate vendor candidates and to determine which depots are optimal for each vendor.

13. The method of claim 1, wherein the method of identifying the vendors who will pick up the packages from their sources, uses a K-means clustering algorithm that uses the time required by each vendor vehicle to reach the package source.

14. The method of claim 13, wherein the time is based on traffic conditions, road types, and speed limits.

15. The method of claim 1, further comprising calculating alternative paths for at least some packages and providing the alternative paths to the vendors.

16. The method of claim 1, wherein the deadlock is detected by monitoring repeated agent states or lack of forward progress for a defined threshold, and wherein invocation of the A* algorithm is limited to a local subgraph.

17. A system for managing logistics of package transportation from pickup to delivery, comprising:

a processor and memory coupled to the processor, the processor executing code that implements— a database of vendors who pick up packages from their sources and deliver them to their destinations;

a network represented by a graph where vertices represent hubs and facilities, and the connections with their characteristics are represented by edges;

a geocoding engine (GE) that converts the package sources and the package destinations into a set of addresses represented by geospatial coordinates;

a hub assignment (HA) engine that matches each package to its first hub after pickup and its last hub before delivery, as well as corresponding vendors from the database of vendors, for the pick-up and the delivery;

a VRP (Vehicle Routing Problem) engine that assigns packages to vendors' vehicles and plans an optimal pickup or delivery sequence for each vehicle;

a Reinforcement Learning (RL) agent trained by i. executing sequential stages of expanding graph scope from central hub-centric subgraphs to a full network, with nodes selected based on centrality ranking;

ii. training the RL agent sequentially across each stage using Q-learning with LightGBM (Light Gradient-Boosting Machine)-based function approximation, wherein each completed stage initializes a subsequent stage;

v. applying N-Secretary stopping criteria to intermediate training rounds by selecting a baseline performance and terminating the training when the RL agent's performance probabilistically exceeds the baseline performance; and vi. deploying the RL agent into a registry with warm-start capability for continued training;

inputting a set of package sources and package destinations;

a Multi-Modal Engine (MME) that uses the trained RL agent from the registry to attempt an optimal path for the packages from the first hub to the last hub when no deadlock occurs;

wherein, when the RL agent is deadlocked, the trained RL agent is complemented by a time-skewed A* algorithm to find a valid path and resolves the deadlock by computing an alternate sub-path around the deadlock to a feasible hub, incrementally replanning only a portion of the optimal path that bypasses the deadlock, thereby avoiding a full recomputation of the optimal path wherein the RL agent takes into account path distance between the package sources and the package destinations, total time that a package is in a vehicle and time inside a hub, and cost of moving the package from the first hub to the last hub; and a dispatch module that dispatches the vehicles of the vendors to pick up and deliver the packages based on the optimal path.

18. The system of claim 17, wherein the system employs a masking method where each segment of an initially chosen path is temporarily considered inoperative, the optimization process is reinitiated, thereby leading to identification of alternative paths that bypass the masked section.

19. The system of claim 17, further comprising a database of synthetic data used to train the RL agent.

20. The system of claim 17, wherein the hybrid model handles packages one by one in a predetermined order or together via a matching algorithm, wherein each package is individually routed, while taking into account capacity of vehicles delivering the packages.

21. The system of claim 17, wherein the hybrid model handles packages together via a matching algorithm to optimize overall network resources by optimally dispatching packages at each hub, and wherein the hybrid model, after routing each package, updates capacities of the graph edges to reflect a current state of the network.

22. The system of claim 17, wherein the RL agent provides alternative paths based on weather, capacity constraints, traffic and/or tolls, while the A* module provides the optimal path that bypasses the deadlock when the deadlock is detected.

\* \* \* \* \*